US010515257B2

(12) United States Patent
Hong

(10) Patent No.: US 10,515,257 B2
(45) Date of Patent: Dec. 24, 2019

(54) HANDWRITTEN SIGNATURE AUTHENTICATION SYSTEM AND METHOD BASED ON TIME-DIVISION SEGMENT BLOCK

(71) Applicant: SECUVE CO., LTD., Seoul (KR)

(72) Inventor: Ki Yoong Hong, Seoul (KR)

(73) Assignee: SECUVE CO., LTD., Seoul (KR)

(*) Notice: Subject to any disclaimer, the term of this patent is extended or adjusted under 35 U.S.C. 154(b) by 80 days.

(21) Appl. No.: 16/060,825

(22) PCT Filed: Dec. 12, 2016

(86) PCT No.: PCT/KR2016/014556
§ 371 (c)(1),
(2) Date: Jun. 8, 2018

(87) PCT Pub. No.: WO2017/099555
PCT Pub. Date: Jun. 15, 2017

(65) Prior Publication Data

US 2018/0357469 A1 Dec. 13, 2018

(30) Foreign Application Priority Data

Dec. 11, 2015 (KR) ........................ 10-2015-0177503

(51) Int. Cl.
*G06K 9/00* (2006.01)
*G06K 9/34* (2006.01)
(Continued)

(52) U.S. Cl.
CPC ......... *G06K 9/00181* (2013.01); *G06F 3/041* (2013.01); *G06F 3/0488* (2013.01);
(Continued)

(58) Field of Classification Search
CPC ........... G06K 9/00181; G06K 9/00154; G06K 9/00416; G06K 9/00926; G06K 9/34;
(Continued)

(56) References Cited

U.S. PATENT DOCUMENTS 5,091,975 A * 2/1992 Berger .............. G06K 9/00154
235/379
5,745,592 A * 4/1998 Nalwa .................. G07C 9/0015
382/119

(Continued)

FOREIGN PATENT DOCUMENTS

JP 2000-353243 A 12/2000
JP 2007-110180 A 4/2007

(Continued)

OTHER PUBLICATIONS

International Search Report of corresponding PCT/KR2016/014556—4 pages (dated Mar. 21, 2017).

(Continued)

*Primary Examiner* — David F Dunphy
(74) *Attorney, Agent, or Firm* — Studebaker & Brackett PC

(57) ABSTRACT

The present disclosure relates to a handwritten signature authentication system and method and, more particularly, to a time-division handwritten signature authentication system and method, in which handwritten signature authentication is performed by handwritten signature characteristics information based on segment blocks including segments divided by a predetermined time slice.

18 Claims, 14 Drawing Sheets

(51) Int. Cl.

| | |
|---|---|
| ***G06F 3/0488*** | (2013.01) |
| ***G06F 3/041*** | (2006.01) |
| ***G06F 21/31*** | (2013.01) |
| ***G06F 21/45*** | (2013.01) |

(52) U.S. Cl.

CPC .............. *G06F 21/31* (2013.01); *G06F 21/45* (2013.01); *G06K 9/00154* (2013.01); *G06K 9/00416* (2013.01); *G06K 9/00926* (2013.01); *G06K 9/34* (2013.01); *G06F 3/04883* (2013.01)

(58) Field of Classification Search

CPC ........ G06F 3/041; G06F 3/0488; G06F 21/31; G06F 21/45

See application file for complete search history.

(56) References Cited

U.S. PATENT DOCUMENTS

| | | | | | |
|---|---|---|---|---|---|
| 5,909,500 | A * | 6/1999 | Moore | G07C 9/0015 | 382/123 |
| 5,930,380 | A * | 7/1999 | Kashi | G06K 9/00154 | 382/119 |
| 6,236,740 | B1 * | 5/2001 | Lee | G06K 9/00154 | 382/100 |
| 2005/0223234 | A1 * | 10/2005 | McOwan | G06K 9/00154 | 713/186 |
| 2014/0300554 | A1 * | 10/2014 | Samuel | G06F 21/32 | 345/173 |
| 2014/0331313 | A1 * | 11/2014 | Kim | G06F 21/32 | 726/16 |
| 2016/0210453 | A1 * | 7/2016 | Seo | G06F 21/32 | |
| 2017/0046560 | A1 * | 2/2017 | Tsur | G06F 21/32 | |

FOREIGN PATENT DOCUMENTS

| | | | |
|---|---|---|---|
| JP | 2007-299226 | A | 11/2007 |
| KR | 10-2006-0057343 | A | 5/2006 |
| KR | 10-2007-0110335 | A | 11/2007 |
| KR | 10-2009-0058145 | A | 6/2009 |
| KR | 10-2011-0053783 | A | 5/2011 |
| KR | 10-2015-0041569 | A | 4/2015 |
| KR | 10-1585842 | B1 | 1/2016 |
| WO | 2015-030500 | A1 | 3/2015 |

OTHER PUBLICATIONS

International Search Report of corresponding Patent Application No. PCT/KR2017/001638—4 pages (dated Apr. 25, 2017).

* cited by examiner

HANDWRITTEN SIGNATURE AUTHENTICATION SYSTEM AND METHOD BASED ON TIME-DIVISION SEGMENT BLOCK

TECHNICAL FIELD

The present disclosure relates to a handwritten signature authentication system and method and, more particularly, to a time-division handwritten signature authentication system and method, in which handwritten signature authentication is performed by handwritten signature characteristics information based on segment blocks including segments divided by a predetermined time slice.

BACKGROUND ART

With the development of application-based smart devices such as smartphones and smart pads and the development of mobile communication technologies and Internet communication technologies, people can easily and simply use various services through the Internet and the applications.

Most services require user authentication before the services are provided to the user because a third party may use the services by stealing the user's identity.

While user authentication can be performed with the user's identification card or driver's license in a presence of the user in the offline environment, in the online environment where the service provider does not come into contact with users, different methods of user authentication are needed.

Accordingly, various technologies have been developed and applied to verify the user's identity of the personal information entered for use of the services.

Such technologies may include an Internet Personal Identification Number (I-PIN) authentication, Short Message Service (SMS) authentication, Automatic Response System (ARS) authentication, and electronic signature or digital signature authentication.

According to the SMS authentication, for example, the service server may transmit an authentication code to a mobile terminal (i.e., a mobile phone or a smartphone) of the user through SMS so that the user may input the received authentication code into a web page or an application program, and verify the user by determining whether the authentication code entered by the user matches the authentication code registered for the mobile terminal.

However, the above-described technologies have a risk of being used illegally by a third party when the mobile terminal is lost or personal information is leaked.

Therefore, there is a trend toward hybrid methods that employ two or more of the above technologies to enhance user security, which is increasing demand for additional technologies for more accurate user authentication.

One of such technologies being developed for enhancing the security can be handwritten signature authentication, which is one of biometric information reflecting personal characteristics of each user.

The handwritten signature authentication technology may be divided into two categories: image comparison method that examines match rates of the images of handwritten signatures and a behavioral characteristics data comparison method that compares behavioral characteristics data when a signer handwrites a signature.

Typically, a handwritten signature authentication method employing the image comparison method has a risk that the third party copies the signature image of the user. In this case, the system may determine that the copied signature of the third party matches the actual signature of the user.

Because of such a problem, the behavioral characteristics data comparison method is preferred in a handwritten signature authentication system.

A handwritten signature authentication system employing the behavioral characteristics data comparison method performs handwritten signature authentication by extracting and storing the characteristics of the user's signature patterns, such as pressure, speed, intersection points, and inflection point angles. However, the behavioral characteristics comparison method also often leads to cases where a third party copies the behavioral characteristics to some extent when copying a handwritten signature image. In some cases, the traditional handwritten signature authentication system determines that two signatures match on the basis of similar behavioral characteristics even when the images of the two signatures are completely different.

Therefore, there is a demand for a method for a handwritten signature authentication system that can distinguish handwritten signatures more accurately, thereby enhancing security with higher levels of handwritten signature recognition and authentication accuracy.

DISCLOSURE OF INVENTION

Technical Problem

The present disclosure provides a segment-block-based handwritten signature authentication system and a method based on time-based division segment blocks that enrolls a handwritten signature by storing handwritten signature characteristics information based on the time-division segment blocks including segments divided by a time slice, acquires handwritten signature characteristics information based on time-division segments from the handwritten signature written by the user upon request for handwritten signature authentication, and performs a segment-based handwritten signature authentication by conducting a comparison between the pre-enrolled handwritten signature characteristics information based on the time-division segment blocks and the acquired handwritten signature characteristics information based on the time-division segment blocks.

Technical Solution

In order to accomplish the above object, the present disclosure provides a time-division segment block-based handwritten signature authentication system. The system includes: a handwritten signature input unit that includes a touch input unit configured to output touch data, as a handwritten signature input data, including position data and pressure data for positions that are touched by a signer for handwritten signature; an enrollment unit configured to enroll handwritten signature characteristics information of each signer; and a handwritten signature authentication unit configured to count time when the handwritten signature input data is entered, store the handwritten signature input data with timestamp information, recognize segments divided by a time slice ($t_1$) from the handwritten signature input data and the timestamp information, generate a handwritten signature image and segment images by identifying the handwritten signature, generate a handwritten signature block containing the handwritten signature image and segment blocks containing the segment images, collect handwritten signature characteristics information ($\Sigma$) including handwritten signature block information, each segment block information, correlation information between the segment blocks, and correlation information between each segment block and the handwritten signature block, map collected handwritten signature characteristics information to identification information of the signer, enroll the collected handwritten signature characteristics information in the enrollment unit, collect handwritten signature characteristics information (Σ) including correlation information between the segment blocks and correlation information between each segment block and the handwritten signature block from the touch data entered through the touch input unit of the handwritten signature input unit upon request for handwritten signature authentication, load enrolled handwritten signature characteristics information (Σ') that corresponds with the identification information of the signer who requests handwritten signature authentication, and perform a segment-block-based handwritten signature authentication according to a match rate by comparing the enrolled handwritten signature characteristics information (Σ') with the collected handwritten signature characteristics information (Σ).

The handwritten signature authentication unit may include: a handwritten signature characteristics extraction unit configured to count time when the handwritten signature input data is entered, store the handwritten signature input data with timestamp information, recognize segments divided by a time slice ($t_1$) from the handwritten signature input data and timestamp information, generate the handwritten signature image and the segment images by identifying the handwritten signature, generate the handwritten signature block containing the handwritten signature image and the segment blocks containing the segment images, and extract the handwritten signature characteristics information (Σ) including overall handwritten signature block characteristics information (Q), overall segment block characteristics information (V), and block correlation characteristics information (C); a handwritten signature segment block authentication unit configured to perform a handwritten signature authentication according to each predetermined match rate by comparing the handwritten signature characteristics information (Σ) extracted from the handwritten signature characteristics extraction unit with the pre-enrolled handwritten signature characteristics information (Σ'); and a control unit configured to save and enroll the handwritten signature characteristics information, as extracted through the handwritten signature characteristics extraction unit, to the enrollment unit at time of request for enrollment, and perform handwritten signature authentication by controlling the handwritten signature segment block authentication unit at time of request for handwritten signature authentication.

The handwritten signature characteristics extraction unit may include: a handwritten signature start detection unit configured to detect a start of the handwritten signature from the touch data; a handwritten signature end detection unit configured to detect an end of the handwritten signature designating a final touch data input point as an end point of the handwritten signature when there is no touch data input for a certain period of time; a time-division segment detection unit configured to count time when the touch data is entered, store the touch data with timestamp information, recognize segments divided by a time slice ($t_1$) from the touch data and the timestamp information, and generate and output the handwritten signature image and the segment images by identifying the handwritten signature; a segment count unit configured to count a number of the segments detected by the time-division segment detection unit; a segment block characteristics detection unit configured to receive the segment images as input, create each segment block ($s_i$) including the corresponding segment image, generate each segment block characteristics information ($v_i$) on the created segment block ($s_i$), and generate and output overall segment block characteristics information (V) including all of the generated segment block characteristics information ($v_i$); an overall handwritten signature block characteristics detection unit configured to generate a handwritten signature block (S) including the handwritten signature image, and generate and output overall handwritten signature block characteristics information (Q) on the handwritten signature block (S); a segment block correlation detection unit configured to generate and output the block correlation characteristics information (C) according to the correlations between the segment blocks and the correlations between the overall handwritten signature block and each segment block; and a handwritten signature characteristics acquisition unit including a handwritten signature block characteristics information generation unit configured to generate and output the handwritten signature characteristics information (Σ) including the overall handwritten signature block characteristics information (Q), the overall segment block characteristics information (V), and the block correlation characteristics information (C).

The overall handwritten signature block characteristics detection unit may further generates and outputs overall handwritten signature block space information ($space_s$) by calculating space area of the handwritten signature block (S). The segment block characteristics detection unit may include: a segment block generation unit configured to receive the segment images as input, and generate and output the segment block ($s_i$) including the corresponding segment image; a segment block position detection unit configured to receive the segment block ($s_i$) as input, and detect and output segment block position information ($p_i$) which is information on all edges of the segment block; a segment block space characteristics detection unit configured to receive at least one of the segment block ($s_i$) and the segment block position information ($p_i$), and generate and output segment block space information ($space_s$) by calculating the space area of the segment block ($s_i$); a space ratio characteristics detection unit configured to receive the overall handwritten signature block space information ($space_s$) and the segment block space information ($space_{s_i}$) from the overall handwritten signature block characteristics detection unit, and generate and output segment block space ratio information (Δi) by calculating a ratio of the space area of the segment block against the overall handwritten signature block space; and a segment block characteristics information generation unit configured to generate, for each segment of the handwritten signature, the segment block characteristics information ($v_i$) including the segment block position information ($p_i$), the segment block space information ($space_{s_i}$), and the segment block space ratio information (Δi), and generates and outputs the overall segment block characteristics information (V) on all segments of the entire handwritten signature.

The block may be a polygon. The segment block generation unit may generate a polygon segment block surrounding a segment by passing through a top, a bottom, a leftmost, and a rightmost points of the segment.

The overall handwritten signature block characteristics detection unit may further generate and output the overall handwritten signature block space information ($space_s$) by calculating space area of the handwritten signature block (S). The segment block correlation detection unit may include: an intersection space detection unit configured to detect any adjacent segment block ($s_i$) having a relation of inclusion or intersection with each segment block ($s_i$), and outputs, if any, intersection space information ($\delta_{ij}$) by calculating space area of inclusion or intersection; an intersection space ratio detection unit configured to receive the overall handwritten signature block space information ($space_s$), the segment block space information ($space_{s_1}$), and the intersection space information ($\delta_{ij}$) as input, generate handwritten signature block intersection space ratio information ($r_{ij}$) by calculating a ratio of the intersection space ($\delta_{ij}$) against the overall handwritten signature block space ($space_s$), generate segment block intersection space ratio information ($\pi'_{ij}$) by calculating a ratio of the intersection space ($\delta_{ij}$) against the segment block space ($space_{s_i}$), and generate adjacent segment block intersection space ratio information ($\pi''_{ij}$) by calculating a ratio of the intersection space ($\delta_{ij}$) against the adjacent segment block space ($space_{s_j}$); a segment block inclusion relation detection unit configured to generate and output segment block inclusion relation information ($O_{ij}$) which shows whether an adjacent segment block ($s_j$) is included in or intersects with a segment block ($s_i$); a segment positional relation detection unit configured to generate and output segment block positional relation information ($POS_{ij}$) representing relative position on all adjacent segment blocks ($s_j$) based on a segment block ($s_i$); an edge positional relation detection unit configured to generate and output segment block edge positional relation information ($EDGE_{ij}$) representing relative edge position at which edge of a segment block ($s_i$) intersects with all adjacent segment blocks ($s_j$); and a correlation characteristics information generation unit configured to generate and output block correlation characteristics information (C) including the intersection space information ($\delta_{ij}$), the handwritten signature block intersection space ratio information ($r_{ij}$), the segment block intersection space ratio information ($\pi'_{ij}$), the adjacent segment block intersection space ratio information ($\pi''_{ij}$), the segment block inclusion relation information ($O_{ij}$), the segment block positional relation information ($POS_{ij}$), and the segment block edge positional relation information ($EDGE_{ij}$).

The time-division segment detection unit may recognize the segments sequentially divided by a time slice ($t_1$) from the touch data that is entered in real time.

The time-division segment detection unit may count input time of touch data when the touch data is entered, stores the entered touch data with timestamp information, and recognizes the segments divided by a time slice ($t_1$) based on handwritten signature elapsed time spent for signing the handwritten signature when the handwritten signature image is detected from the touch data.

The segment block generation unit may further detect sub-segment blocks ($\acute{s}_{i.x}$) and vacancy blocks ($\tilde{s}_{i.y}$) that are generated by segments disjointed in each generated segment block. The segment block position detection unit may further detect and output sub-segment block position information ($\acute{p}_{i.x}$) for the sub-segment block ($\acute{s}_{i.x}$), and vacancy block position information ($\tilde{p}_{i.y}$) for a vacancy block ($\tilde{s}_{i.y}$). The segment block space characteristics detection unit may further generate and output sub-segment block space information ($space(\acute{s}_{i.x})$) and vacancy block space information ($space(\tilde{s}_{i.y})$) by calculating space areas of the sub-segment blocks ($\acute{s}_{i.x}$) and the vacancy blocks ($\tilde{s}_{i.y}$) respectively. In case that there exist a plurality of sub-segment blocks ($\acute{s}_{i.x}$) in a segment block ($s_i$), the space ratio characteristics detection unit may output sub-segment block space ratio information ($\Delta_{i.x}$) by calculating a ratio of the sub-segment block space ($space(\acute{s}_{i.x})$) against the segment block space ($space_{s_i}$), and output vacancy block space ratio information ($\Delta_{i.y}$) by calculating a ratio of the vacancy block space ($space(\tilde{s}_{i.y})$) against the segment block space ($space_{s_i}$). The segment block characteristics information generation unit may generate and output the overall segment block characteristics information (V) further including: the sub-segment block position information ($\acute{p}_{i.x}$) for the sub-segment block ($\acute{s}_{i.x}$); the vacancy block position information ($\tilde{p}_{i.y}$) for the vacancy block ($\tilde{s}_{i.y}$); the sub-segment block space information ($space(\acute{s}_{i.x})$); the vacancy block space information ($space(\tilde{s}_{i.y})$); the sub-segment block space ratio information ($\acute{\Delta}_{i.x}$); and the vacancy block space ratio information ($\tilde{\Delta}_{i.y}$).

In order to accomplish the above objects, the present disclosure provides a handwritten signature authentication based on time-division segment block method. The method includes: an enrollment process of storing handwritten signature input data including touch data entered from a handwritten signature input unit with timestamp information, recognizing segments divided by a time slice ($t_1$) from the handwritten signature input data and timestamp information, generating a handwritten signature image and segment images by identifying the handwritten signature, generating a handwritten signature block containing the handwritten signature image and segment blocks containing the segment images, collecting handwritten signature characteristics information ($\Sigma$) including handwritten signature block information, each segment block information, correlation information between the segment blocks, and correlation information between each segment block and the handwritten signature block, mapping the collected handwritten signature characteristics information to identification information of a signer, and enrolling the collected handwritten signature characteristics information in the enrollment unit; and a handwritten signature authentication process of collecting handwritten signature characteristics information ($\Sigma$) including correlation information between the segment blocks and correlation information between each segment block and the handwritten signature block from the touch data entered through the touch input unit of the handwritten signature input unit upon request for handwritten signature authentication, loading the enrolled handwritten signature characteristics information ($\Sigma'$) that corresponds with the identification information of the signer who requests handwritten signature authentication, and performing a segment-block-based handwritten signature authentication according to a match rate by comparing the enrolled handwritten signature characteristics information ($\Sigma'$) with the collected handwritten signature characteristics information ($\Sigma$).

The enrollment process may include: an enrollment request monitoring operation that monitors whether handwritten signature enrollment is made; a signer identification information acquisition operation that acquires the signer identification information to be enrolled upon request for handwritten signature enrollment; a handwritten signature characteristics information acquisition operation that acquires the handwritten signature characteristics information ($\Sigma$) from touch data entered through the touch input unit regarding to the handwritten signature of the signer; and a handwritten signature enrollment operation that maps the handwritten signature characteristics information to the identification information of the signer and enrolls the handwritten signature characteristics information in the enrollment unit.

The signature authentication process may include: a handwritten signature authentication request monitoring operation that monitors whether handwritten signature authentication is made; a signer identification information acquisition operation that acquires the signer identification information upon request for handwritten signature authentication; a handwritten signature characteristics information acquisition operation that acquires the handwritten signature characteristics information (Σ) from touch data entered from the touch input unit regarding to the handwritten signature of the signer; an enrolled handwritten signature characteristics information loading operation that loads the pre-enrolled handwritten signature characteristics information (Σ') corresponding with the acquired signer identification information; and a handwritten signature authentication operation that performs handwritten signature authentication by comparing the acquired handwritten signature characteristics information (Σ) with the enrolled handwritten signature characteristics information (Σ') as loaded and outputs a result of the authentication.

The handwritten signature characteristics information (Σ) acquisition operation may include: a handwritten signature tracking operation that begins tracking the handwritten signature from the touch data of the handwritten signature input data entered from the handwritten signature input unit; a segment detection operation that counts time when the handwritten signature tracking begins, stores the handwritten signature input data with timestamp information, and recognizes and outputs segments divided by a time slice($t_1$) from the handwritten signature input data and the timestamp information; a segment count operation that counts a number of the segments detected by the segment detection unit; a segment block characteristics detection operation that receives the segment image as input, creates each segment block ($s_i$) including the corresponding segment image, and generates and outputs each segment block characteristics information ($v_i$) on the created segment block ($s_i$); an overall handwritten signature block characteristics detection operation that creates a handwritten signature block (S) including the acquired handwritten signature image, and generates and outputs overall handwritten signature block characteristics information (Q) on the handwritten signature block (S); a segment block correlation detection operation that generates and outputs block correlation characteristics information (C) according to the correlations between the segment blocks and the correlations between the overall handwritten signature block and each segment block; and a handwritten signature block characteristics information generation operation that generates overall segment block characteristics information (V) including segment block characteristics information ($v_i$) on all segments, and generates and outputs handwritten signature characteristics information (Σ) including the overall handwritten signature block characteristics information (Q), the overall segment block characteristics information (V), and the block correlation characteristics information (C).

The overall handwritten signature block characteristics detection operation may further generate and output overall handwritten signature block space information ($space_s$) by calculating space area of the handwritten signature block (S). The segment block characteristics detection operation may include: a segment block generation operation that receives the segment images as input, and generates and outputs the segment block ($s_i$) including the corresponding segment image; a segment block position detection operation that receives the segment block ($s_i$) as input, and detects and outputs segment block position information ($p_i$), which is position information on all edges of the segment block; a segment block space characteristics detection operation that receives at least one of the segment block ($s_i$) and the segment block position information ($p_i$), and generates and outputs segment block space information ($space_{s_i}$) by calculating the space area of the segment block ($s_i$); a space ratio characteristics detection operation that receives the segment block space information ($space_{s_i}$) and the overall handwritten signature block space information ($space_s$) detected from the overall handwritten signature block characteristics detection unit, and generates and outputs segment block space ratio information ($\Delta_i$) by calculating a ratio of the space area of the segment block ($space_{s_i}$) against the overall handwritten signature block space ($space_s$); and a segment block characteristics information generation operation that generates, for each segment of handwritten signature, segment block characteristics information ($v_i$) including the segment block position information ($p_i$), the segment block space information ($space_{s_i}$), and the segment block space ratio information ($\Delta_i$), and generates and outputs the overall segment block characteristics information (V) on all segments of the entire handwritten signature.

The block may be a polygon. The segment block generation unit may generate a polygon segment block surrounding a segment by passing through a top, a bottom, a leftmost, and a rightmost points of the segment in the segment block generation operation.

The overall handwritten signature block characteristics detection operation may further generate and output the overall handwritten signature block space information ($space_s$) by calculating space area of the handwritten signature block (S). The segment block correlation detection operation may include: an intersection space detection operation that detects any adjacent segment block ($s_j$) having a relation of inclusion or intersection with each segment block ($s_i$), and outputs, if any, intersection space information ($\delta_{ij}$) by calculating space area of inclusion or intersection; an intersection space ratio detection operation that receives the overall handwritten signature block space information ($space_s$), the segment block space information ($space_{s_i}$), and the intersection space information ($\delta_{ij}$) as input, generates handwritten signature block intersection space ratio information ($r_{ij}$) by calculating a ratio of the intersection space ($\delta_{ij}$) against the overall handwritten signature block space ($space_s$), generates segment block intersection space ratio information ($\pi'_{ij}$) by calculating a ratio of the intersection space ($\delta_{ij}$) against the segment block space ($space_{s_i}$), and generates adjacent segment block intersection space ratio information ($\pi''_{ij}$) by calculating a ratio of the intersection space ($\delta_{ij}$) against the adjacent segment block space ($space_{s_j}$); a segment block inclusion relation detection operation that generates and outputs segment block inclusion relation information ($O_{ij}$) which shows whether an adjacent segment block ($s_j$) is included in or intersects with a segment block ($s_i$); a segment positional relation detection operation that generates and outputs segment block positional relation information ($POS_{ij}$) representing relative position on all adjacent segment blocks ($s_j$) based on a segment block ($s_i$); an edge positional relation detection operation that generates and outputs segment block edge positional relation information ($EDGE_{ij}$) representing relative edge position at which edge of a segment block ($s_i$) intersects with all adjacent segment block ($s_j$); and a correlation characteristics information generation operation that generates and outputs block correlation characteristics information (C) including the intersection space information ($\delta_{ij}$), the handwritten signature block intersection space ratio information ($r_{ij}$), the segment block intersection space ratio information ($\pi'_{ij}$), the adjacent segment block intersection space ratio information ($\pi''_{ij}$), the segment block inclusion relation information ($O_{ij}$), the segment block positional relation information ($POS_{ij}$), and the segment block edge positional relation information ($EDGE_{ij}$).

The segment block generation operation may include: a segment block detection operation that receives the segment images as input, and generates and outputs the segment block ($s_i$) including the corresponding segment image; a sub-segment block detection operation that detects sub-segment blocks ($\acute{s}_{i.x}$) with respect to sub-segments generated by disjointed segments in each generated segment block; and a vacancy block detection operation that detects vacancy blocks ($\tilde{s}_{i.y}$) which are vacancy space generated by the sub-segment blocks in each generated segment block. The segment block position detection operation may include: a segment block position information generation operation that receives the segment blocks ($s_i$), and detects and outputs segment block position information ($p_i$) which is information on all edges of each segment block; a sub-segment block position information generation operation that detects and outputs sub-segment block position ($\acute{p}_{i.x}$) for each sub-segment block ($\acute{s}_{i.x}$); and a vacancy block position information generation operation that detects and outputs vacancy block position information ($\tilde{p}_{i.y}$) for each vacancy block ($\tilde{s}_{i.y}$). The segment block space characteristics information detection operation may include: a segment block space characteristics generation operation that receives at least one of the segment block ($s_i$) and the segment block position information ($p_i$), and generates and outputs segment block space information ($space_{s_i}$) by calculating the space area of each segment block ($s_i$); a sub-segment block space characteristics information generation operation that generates and outputs sub-segment block space information (space($\acute{s}_{i.x}$)) by calculating the space area of the sub-segment block ($\acute{s}_{i.x}$); and a vacancy block space characteristics information generation operation that generates and outputs vacancy block space information (space($\tilde{s}_{i.y}$)) by calculating the space area of the vacancy blocks ($\tilde{s}_{i.y}$). The space ratio characteristics detection operation may include: a space ratio characteristics information generation operation that receives the overall handwritten signature block space information ($space_s$) and the segment block space information ($space_{s_i}$) from the overall handwritten signature block characteristics detection operation, and generates and outputs segment block space ratio information ($\Delta_i$) by calculating a ratio of the segment block space ($space_{s_i}$) against the overall handwritten signature block space ($space_s$); a sub-segment space ratio characteristics information generation operation that, in case that there exist a plurality of sub-segment blocks ($\acute{s}_{i.x}$) in a segment block ($s_i$), generates and outputs sub-segment block space ratio information ($\acute{\Delta}_{i.x}$) by calculating a ratio of the sub-segment block space (space($\acute{s}_{i.x}$)) against the segment block space ($space_{s_i}$); and a vacancy block space ratio characteristics information generation operation that, in case that there exist a plurality of sub-segment blocks ($\acute{s}_{i.x}$) in a segment block ($s_i$), generates and outputs vacancy block space ratio information ($\tilde{\Delta}_{i.y}$) by calculating a ratio of the vacancy block space (space($\tilde{s}_{i.y}$)) against the segment block space ($space_{s_i}$). The segment block characteristics information generation operation generates and outputs the overall segment block characteristics information (V) further including: the sub-segment block position information ($\acute{p}_{i.x}$) for the sub-segment block ($\acute{s}_{i.x}$); the vacancy block position information ($\tilde{p}_{i.y}$) for the vacancy block ($\tilde{s}_{i.y}$); the sub-segment block space information (space($\acute{s}_{i.x}$)); the vacancy block space information (space($\tilde{s}_{i.y}$)); the sub-segment block space ratio information ($\acute{\Delta}_{i.x}$); and the vacancy block space ratio information ($\tilde{\Delta}_{i.y}$).

Advantageous Effects

According to the present disclosure, a handwritten signature of a signer is divided into segments by a time slice based on handwritten signature elapsed time spent for signing a handwritten signature, and the handwritten signature authentication is performed by using characteristics information of segment blocks containing the divided time-division segments, characteristics information of overall handwritten signature block, and correlation information between the segment blocks. Therefore, the present disclosure may perform the handwritten signature authentication based specifically on the segment blocks and improve a recognition rate of the handwritten signature.

DESCRIPTION OF DRAWINGS

FIGS. 7A to 7D illustrate a method of generating an inclusive relation of segment blocks which is one of correlation information between the segment blocks according to an embodiment of the present disclosure;

BEST MODE

The configuration and operation of a time division segment block-based handwritten signature authentication system according to an embodiment of the present disclosure will be described first with reference to attached drawings, and then a time division segment block-based handwritten signature authentication method in the system will be described.

In the present disclosure, handwritten signature time-division segments (hereinafter, abbreviated as "time-division segments," "handwritten signature segments," or "segments" for simplicity) refer to parts of a handwritten signature generated by dividing the handwritten signature by a time slice based on handwritten signature elapsed time spent for signing the handwritten signature by a signer. Therefore, for a same signature, the number of the handwritten signature segments may differ depending on the signer. For example, the number of the handwritten signature segments (n) for a signature may be one, two, three, or four depending on the signer, even if the signer tries to write the same signature. Similarly, the correlations between the segments will be different as the positions and lengths of the segments will also be different depending on the signer even if the signer tries to write the same signature.

Furthermore, in the present disclosure, a segment block refers to a polygonal block containing one or more segments. The polygonal block may be formed according to a same rule for all segments. For example, in case that the polygon is rectangular-shaped, the rectangular block which is determined based on a time-division signature segment may be formed lines passing through all of a top point ($top_i$), a bottom point ($bottom_i$), a leftmost point ($left_i$), and a rightmost point ($right_i$) (i means the index of a segment, i=0, 1, 2, 3 . . . n−1) in the segment with the minimum space possible.

Figure 1:
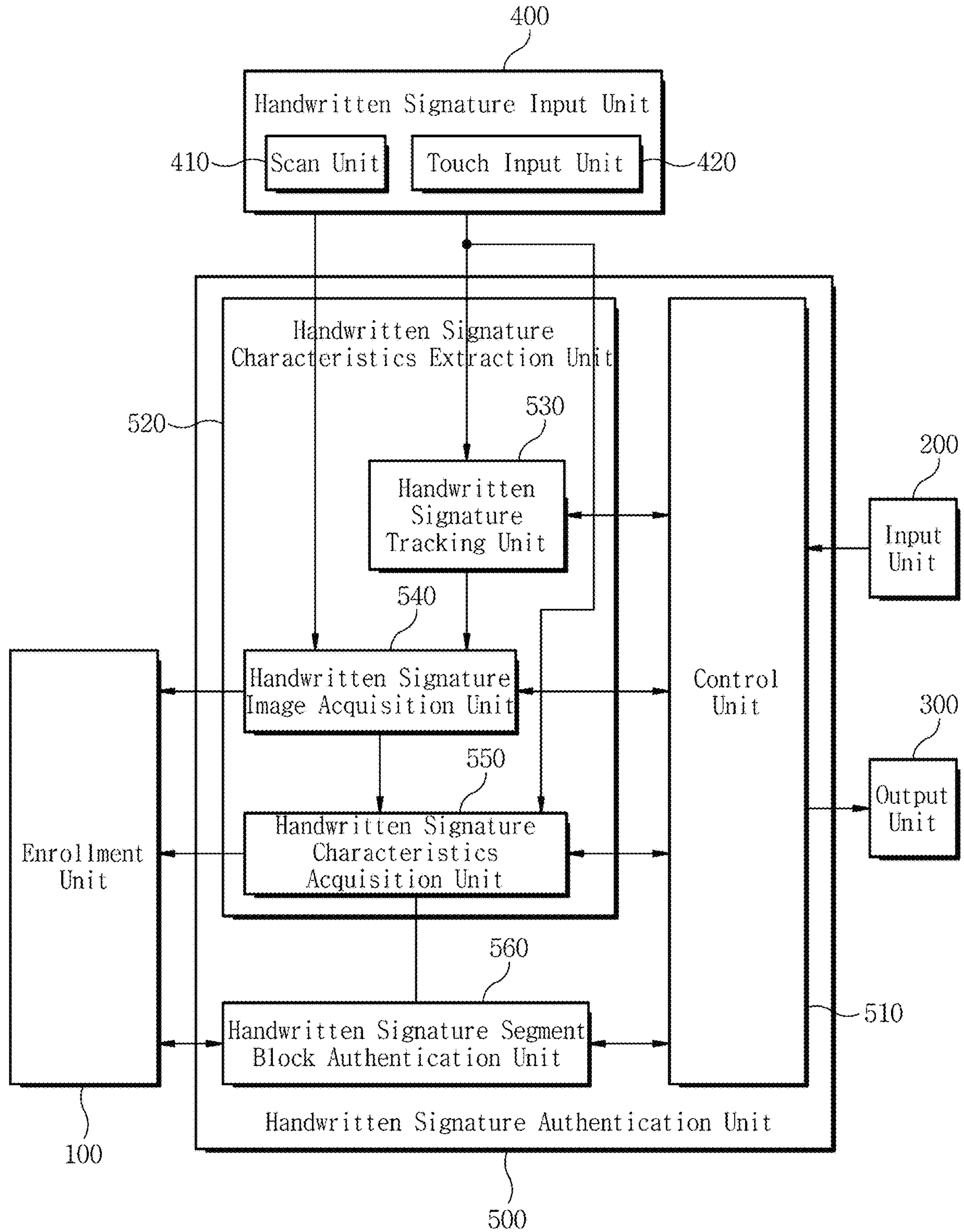
FIG. 1 is a block diagram of a time division segment block-based handwritten signature authentication system according to an embodiment of the present disclosure.

FIG. 1 is a block diagram of a time division segment block-based handwritten signature authentication system according to an embodiment of the present disclosure.

Referring to FIG. 1. the time division segment block-based handwritten signature authentication system according to an embodiment of the present disclosure may include an enrollment unit 100, a handwritten signature input unit 400, and a handwritten signature authentication unit 500, and may further include an input unit 200 and an output unit 300.

The enrollment unit 100 may be set up in a variety of storage media including a hard drive of a personal computer (PC) or a laptop computer, a portable hard drive such as a universal serial bus (USB) device, a security token, a subscriber identification module (SIM) card embedded in a mobile device such as a cell phone or a smartphone, a micro SD card in the mobile device, a TrustZone in the mobile device, and an online hard drive. The enrollment unit 100 stores handwritten signature characteristics information (Σ).

The handwritten signature characteristics information (Σ) includes overall handwritten signature block characteristics information (Q), overall segment block characteristics information (V), and block correlation characteristics information (C). Detailed information included in these types of information will be described more fully with reference to FIGS. 2 to 5 below.

The input unit 200 may be a key input device that has numerous keys generating multiple commands and outputs key data (key signals) on pressed keys, a touchpad that also functions as a screen and outputs position data on touch points, and a receiver that receives data from an external device through wired and wireless communications. The input unit 200 sends commands such as a handwritten signature enrollment command and a handwritten signature authentication command upon request of a user to the handwritten signature authentication unit 500. If the handwritten signature authentication unit 500 is configured in the form of a server, the input unit 200 may also be a point-of-sale (POS) terminal, payment terminal, or mobile communication terminal from a remote place.

The output unit 300 allows the handwritten signature authentication unit 500 to output a handwritten signature image, the handwritten signature characteristics information, and handwritten signature verification result. In case that the handwritten signature authentication unit 500 is configured in a mobile communication terminal, the output unit 300 may be a display device such as a liquid crystal display (LCD). In case that the handwritten signature authentication unit 500 is configured to be a server, the output unit 300 may be a message transmission server that transmits a mobile communication message containing a handwritten signature verification result such as a short message service (SMS) message, a long message service (LMS) message, a multimedia message service (MMS) message, an application server that transmits a push message, an e-mail server, or a mobile communication terminal that receives and displays the verification result.

The handwritten signature input unit 400 may be configured in a terminal unit that receives a handwritten signature, such as a PC, mobile communication terminal, POS terminal, or payment terminal owned by a user or a service provider. Also, the handwritten signature input unit 400 may be a separate device capable of being connected to a separate device and output handwritten signature input data to acquire an image of the handwritten signature written by the user and may include at least one of a scan unit 410 and a touch input unit 420. It is recommended, however, to ensure that it includes a touch input unit 420 as it should receive input of a signature in a handwritten form. The touch input unit 420 may be a touchpad, touchscreen, or smart pen, which enables to track a handwritten signature and collect image characteristics information of handwritten signature and segments, and behavioral characteristics information.

The scan unit 410 scans a paper on which a signature is handwritten and sends scanned data to the handwritten signature authentication unit 500.

The touch input unit 420 may be a touchpad or a touchscreen and sends touch data that includes continuous position data and pressure data on a signature handwritten by a user to the handwritten signature authentication unit 500 as input data.

The handwritten signature authentication unit 500 includes a control unit 510, a handwritten signature characteristics extraction unit 520, and a handwritten signature segment block authentication unit 560.

The handwritten signature authentication unit 500 may be configured based on an application in a mobile communication terminal or a computer, based on an application or a web server in a server, or in the form of firmware in a POS or payment terminal. The configuration of an application server, web server, and firmware based on an application, firmware, or web server according to the present invention will not be further described in detail as it is obvious to those skilled in the art.

To describe the configuration and operation of the handwritten signature authentication unit 500 in more detail, the control unit 510 controls overall operation of the handwritten signature authentication unit 500. In particular, the control unit 510 determines whether the command received from the input unit 200 is for handwritten signature enrollment or authentication, controls the operation of enrollment or authentication depending on the command, and sends the control results to the output unit 300.

The handwritten signature characteristics extraction unit 520 extracts and outputs the handwritten signature characteristics information (Σ) based on the time-division segment block from the handwritten signature input data entered through the touch input unit 420 of the handwritten signature input unit 400.

In detail, the handwritten signature characteristics extraction unit 520 includes a handwritten signature tracking unit 530, a handwritten signature image acquisition unit 540, and a handwritten signature characteristics acquisition unit 550.

The handwritten signature tracking unit 530 detects continuous position data from the touch data from the touch input unit 420 of the handwritten signature input unit 400 and sends it to the handwritten signature image acquisition unit 540.

The handwritten signature image acquisition unit 540 receives the scan data from the handwritten signature input unit 400 or the position data from the handwritten signature tracking unit 530, and acquires and outputs a handwritten signature image from the scan data or the position data.

The handwritten signature image acquisition unit 540 may acquire a tracked handwritten signature image from the scan unit 410 or may generate the tracked handwritten signature image by tracking the position data entered in real time through the touch input unit 420 and the handwritten signature tracking unit 530.

The handwritten signature characteristics acquisition unit 550 receives the touch data entered continuously by the touch input unit 420, check timestamp information when the touch data is received, divides the input touch data by a predetermined time slice to identify the handwritten signature segments, counts the number (n) of identified handwritten signature segments, and generates handwritten signature segment images for the identified handwritten signature segments.

In addition, the handwritten signature characteristics acquisition unit 550 generates blocks (hereinafter, referred to as "segment blocks") of a polygon (hereinafter, assumed to be a rectangle) for each of the generated handwritten signature segment images, extracts overall segment block characteristics information (V) on the generated segment blocks, generates an overall handwritten signature block for the entire handwritten signature image entered from the handwritten signature image acquisition unit 540 or acquired by the handwritten signature image acquisition unit 540 itself, generates overall handwritten signature block characteristics information (Q) on the overall handwritten signature block, generates block correlation characteristics information (C) based on correlations between the segment blocks, and generates and outputs handwritten signature characteristics information (Σ) that includes the generated overall segment block characteristics information (V), overall handwritten signature block characteristics information (Q), and block correlation characteristics information (C), as shown in Equation 1 below.

$$\Sigma=\{V,Q,C\} \quad \text{[Equation 1]}$$

The detailed configuration of the handwritten signature characteristics acquisition unit 550 will be described below with reference to FIGS. 2, 3, and 5.

Upon receiving the handwritten signature authentication command from the control unit 510, the handwritten signature segment block authentication unit 560 receives signer's identification information from the handwritten signature input unit 400 and the handwritten signature characteristics information (Σ) from the handwritten signature characteristics extraction unit 520, loads pre-enrolled handwritten signature characteristics information (Σ') corresponding to the signer identification information from the enrollment unit 100, compares the loaded pre-enrolled handwritten signature characteristics information (Σ') with the handwritten signature characteristics information (Σ) entered from the handwritten signature characteristics extraction unit 520 to determine whether they match beyond a predetermined matching level.

To be more specific, the handwritten signature segment block authentication unit 560 compares the enrolled overall block characteristics information (Q') of the loaded enrolled handwritten signature characteristics information (Σ') with the overall handwritten signature block characteristics information (Q) of the handwritten signature characteristics information (Σ) extracted through the handwritten signature characteristics extraction unit 520, compares enrolled overall segment block characteristics information (V') with the extracted overall segment characteristics information (V), and compares loaded block correlation characteristics information (C') with the extracted block correlation characteristics information (C) to perform the handwritten signature authentication by determining whether the match rates of the above comparisons respectively reach predetermined matching levels.

Figure 2:
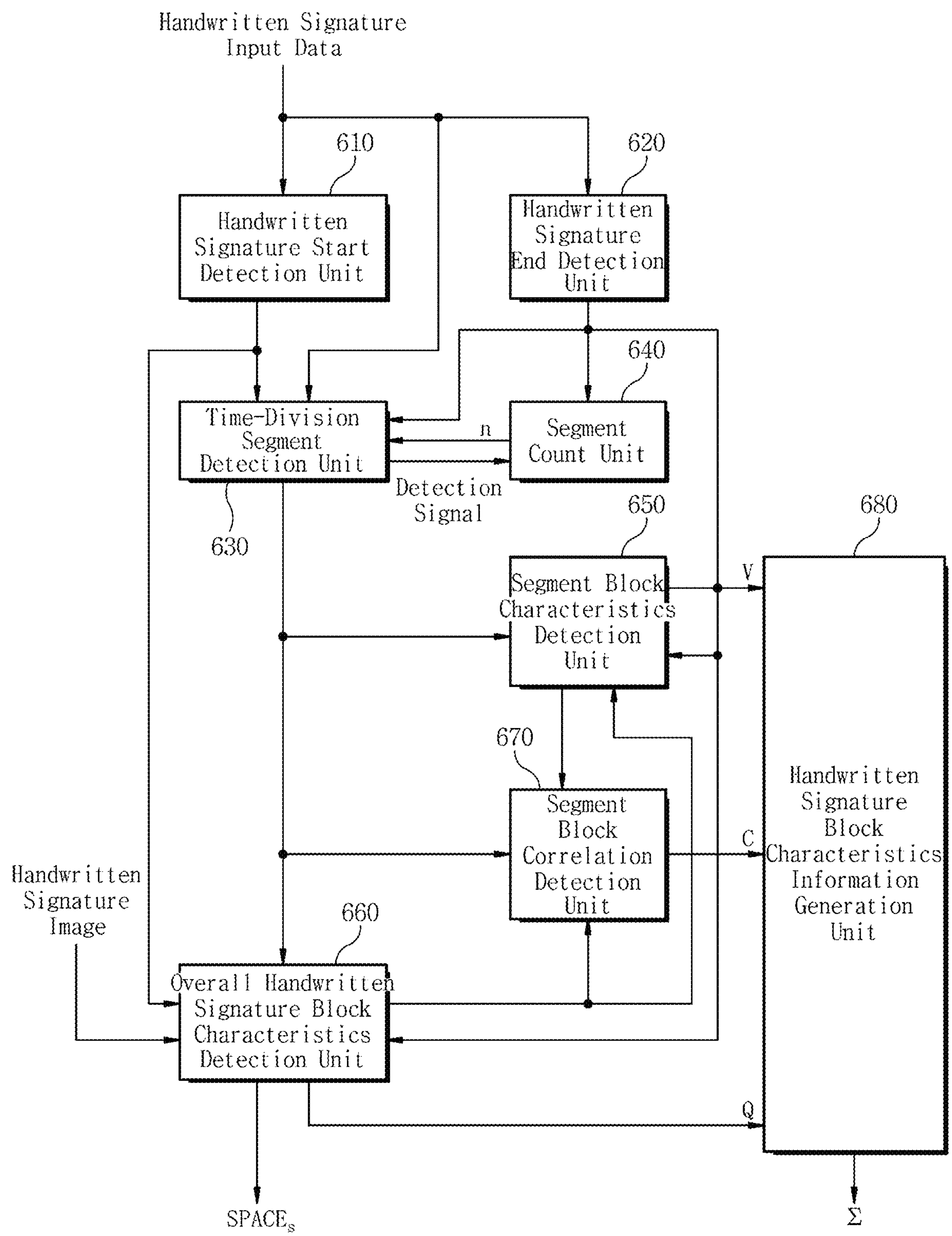
FIG. 2 is a block diagram of a handwritten signature characteristics acquisition unit in the time division segment block-based handwritten signature authentication system according to an embodiment of the present disclosure.
Figure 3:
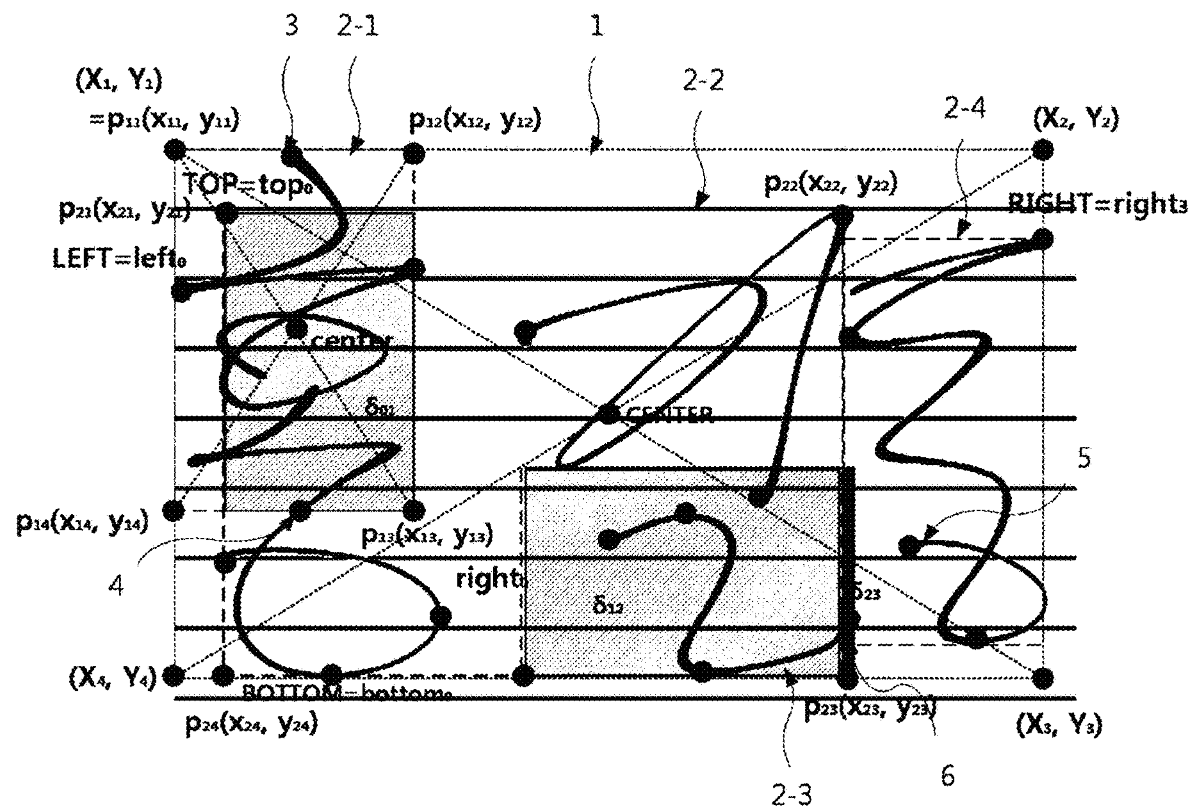
FIG. 3 illustrates a method for generating time-division segment blocks of a handwritten signature along with characteristics information elements of time-division segment blocks according to an embodiment of the present disclosure.

FIG. 2 is a block diagram of a handwritten signature characteristics acquisition unit in the time division segment block-based handwritten signature authentication system according to an embodiment of the present disclosure, FIG. 3 illustrates a method for generating time-division segment blocks of a handwritten signature along with characteristics information elements of time-division segment blocks according to an embodiment of the present disclosure, and FIGS. 4A to 4D illustrate the method for generating time-division segment blocks of the handwritten signature and characteristics information elements of the time-division segment blocks shown in FIG. 3 in detail. The configuration and operation of the handwritten signature characteristics acquisition unit 550 will be described in detail with reference to FIGS. 2, 3 and 4A to 4D.

The handwritten signature characteristics acquisition unit 550 includes a handwritten signature start detection unit 610, a handwritten signature end detection unit 620, a time-division segment detection unit 630, a segment count unit 640, a segment block characteristics detection unit 650, an overall handwritten signature block characteristics detection unit 660, a segment block correlation detection unit 670, and a handwritten signature block characteristics information generation unit 680.

The handwritten signature start detection unit 610 receives continuous handwritten signature input data from the touch input unit 400 while the signer handwrites a signature on the touch input unit 420 of the handwritten signature input unit 400 as shown in FIG. 3.

When the handwritten signature input data starts to be input, the handwritten signature start detection unit 610 detects a start point (3) as shown in FIG. 3. The start point (3) is a start point of a first handwritten signature segment.

The handwritten signature start detection unit 610 outputs handwritten signature start point information, which is also a start point information of the first segment, and sends a handwritten signature start point detection signal to the time-division segment detection unit 630.

If the handwritten signature input data is not entered through the touch input unit 420 for a certain period of time, the handwritten signature end detection unit 620 detects and determines the end point of the handwritten signature corresponding to the final touch data input point, namely Point (5) in FIG. 3, as the end point of the handwritten signature, and outputs the determined end point information of the handwritten signature.

Upon receiving the handwritten signature start point detection signal from the handwritten signature start detection unit 610, the time-division segment detection unit 630 counts time by driving a timer (not shown in the drawings), divides the handwritten signature into segments by a predetermined time slice (hereinafter, referred to as "time slice"), detects a start point and an end point of each handwritten signature segment, and outputs a segment detection signal to the segment count unit 640 whenever a new segment is detected. Here, the elapsed time spent for of a last segment may be shorter than the time slice.

Referring to FIGS. 3 and 4, for example, the time-division segment detection unit 630 begins counting of the time, when the signer starts handwriting a signature, checks whether the counted time ($t_c$) reaches the time slice ($t_1$), and, when the counted time ($t_c$) reaches the time slice ($t_1$), the time-division segment detection unit 630 detects a first segment and generates a segment block (2-1). Afterwards, the time-division segment detection unit 630 initializes the timer to count the time again, checks whether the counted time ($t_c$) reaches the time slice ($t_1$), and, when the counted time ($t_c$) reaches the time slice ($t_1$), detects a second segment and generate a segment block (2-2). Furthermore, the time-division segment detection unit 630 detects a third and a fourth segments and generates segment blocks (2-3, 2-4) in the same manner. A last segment block (2-4) is generated based on the end point information of the handwritten signature entered from the handwritten signature end detection unit 620.

The time-division segment detection unit 630 outputs start point information of the start point (3) and end point information of the end point (4) of each of the detected segments.

In the example shown in FIG. 3, the time-division segment detection unit 630 detects four segments and output a detection signal whenever each of the segments is detected.

Also, the time-division segment detection unit 630 tracks the handwritten signature segments, generates segment images, and outputs the segment image to the segment block characteristics detection unit 650.

The segment count unit 640 counts the number (n) of segments each time the segment detection signal is received from the time-division segment detection unit 630, and outputs count information when a handwritten signature end signal is received from the handwritten signature end detection unit 620. In the example shown in FIG. 3, the segment count unit 640 outputs four as the count information.

When a segment image is entered from the time-division segment detection unit 630, the segment block characteristics detection unit 650 generates a segment block ($s_0$) (2-1) including the entered segment image, generates segment block characteristics information ($v_0$) for the segment block ($s_0$), and generates the overall segment block characteristics information (V) when acquiring the segment block characteristics information ($v_i$) for all the segments. The detailed configuration and operation of the segment block characteristics detection unit 650 will be described below with reference to FIGS. 4A to 4D.

The segment blocks may have a form of a various shapes of polygon, such as a rectangle and a pentagon, however, it is recommended that the segment blocks are rectangular-shaped as shown in FIGS. 3 and 4, so the same rule may be applicable in generating and describing all the segments of a handwritten signature.

The rectangular segment block (2) according to the present disclosure is generated based on the corresponding handwritten signature segment which is formed by dividing the handwritten signature by a predetermined time slice. In particular, the rectangular segment block includes a segment image passing through a top position ($top_i$), a bottom position ($bottom_i$), a leftmost position ($left_i$), and a rightmost position ($right_i$) of the segment.

The overall handwritten signature block characteristics detection unit 660 generates a handwritten signature image by composing the segment images entered from the handwritten signature image acquisition unit 540 or the time-division segment detection unit 630, generates an overall handwritten signature block (S) including the generated entire handwritten signature image, and generates the overall block characteristics information (Q) for the overall handwritten signature block (S). The overall block characteristics information (Q) includes position data of four corners[$\{(X_1,Y_1), (X_2, Y_2), (X_3, Y_3), (X_4, Y_4)\}$] of the overall handwritten signature block (S) and overall handwritten signature block space information ($space_s$) of the overall handwritten signature block (S) as shown in Equation 2.

$$Q=\{(X_1,Y_1),(X_2,Y_2),(X_3,Y_3),(X_4,Y_4)\}\cup\{space_s\} \quad \text{[Equation 2]}$$

The segment block correlation detection unit 670 receives the segment block characteristics information ($v_i$) from the segment block characteristics detection unit 650 and receives the overall handwritten signature block space information ($space_s$) of the handwritten signature block (1) from the overall handwritten signature block characteristics detection unit 660. The segment block correlation detection unit 670 generates the block correlation characteristics information (C) including correlation information between each segment block ($s_i$) and one or more of its adjacent segment blocks ($s_j$) between each segment block and the overall handwritten signature block.

The handwritten signature block characteristics information generation unit 680 receives the overall segment block characteristics information (V) from the segment block characteristics detection unit 650, the overall handwritten signature block characteristics information (Q) from the overall handwritten signature block characteristics detection unit 660, and the block correlation characteristics information (C) from the segment block correlation detection unit 670, and generates and outputs the handwritten signature characteristics information (Σ) including the overall segment block characteristics information (V), the overall handwritten signature block characteristics information (Q), and the block correlation characteristics information (C).

Figure 5:
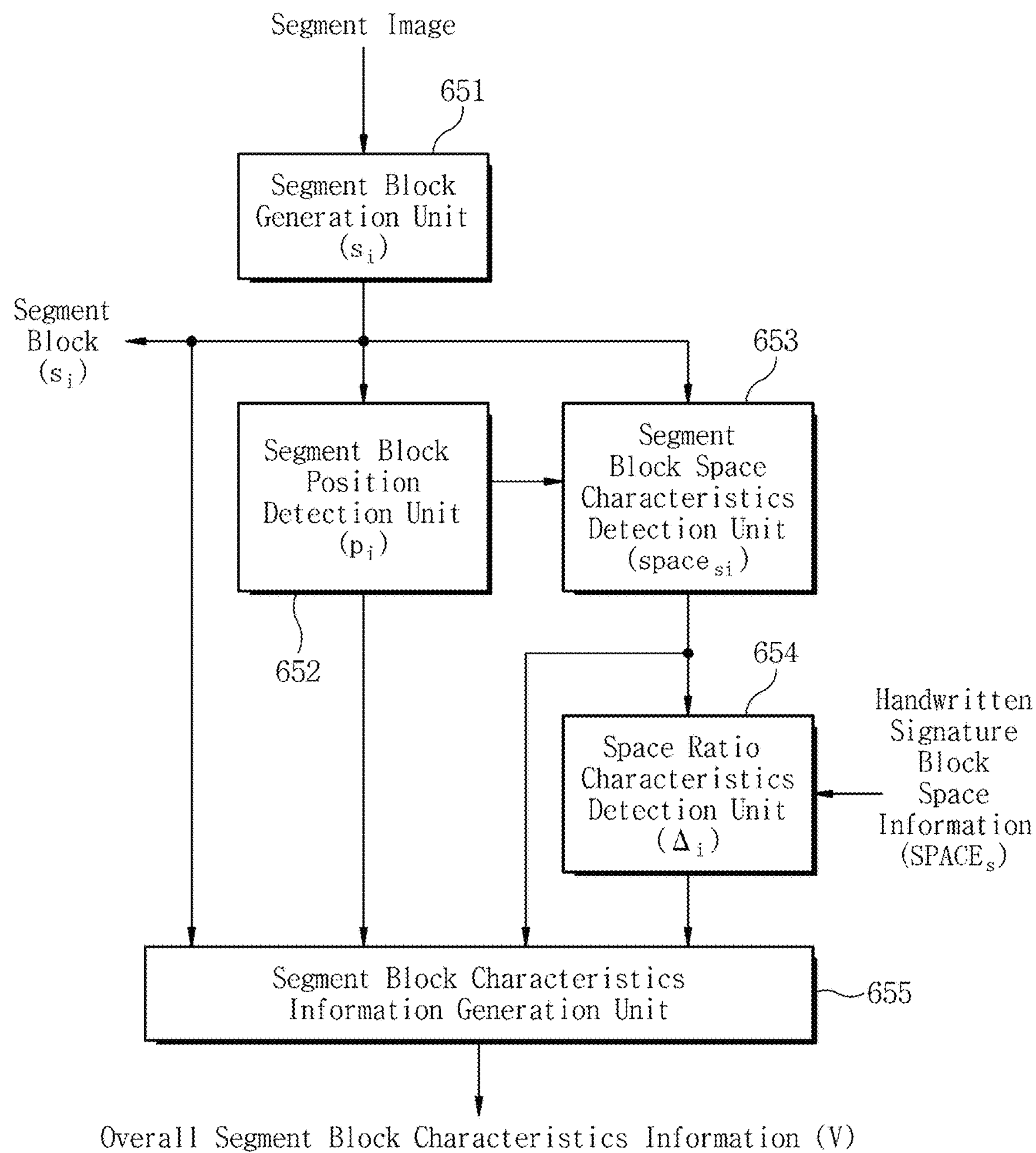
FIG. 5 is a block diagram of a time-division segment block characteristics detection unit in the handwritten signature characteristics acquisition unit according to an embodiment of the present disclosure.

FIG. 5 is a block diagram of a time-division segment block characteristics detection unit in the handwritten signature characteristics acquisition unit according to an embodiment of the present disclosure.

The segment block characteristics detection unit 650 includes a segment block generation unit 651, a segment block position detection unit 652, a segment block space characteristics detection unit 653, a space ratio characteristics detection unit 654, and a segment block characteristics information generation unit 655.

The segment block generation unit 651 receives the segment images from the time-division segment detection unit 630, and generates and outputs the segment blocks ($s_i$) including the segment images to the segment block position detection unit 652, the segment block space characteristics detection unit 653, and the segment block characteristics information generation unit 655.

Figure 4A:
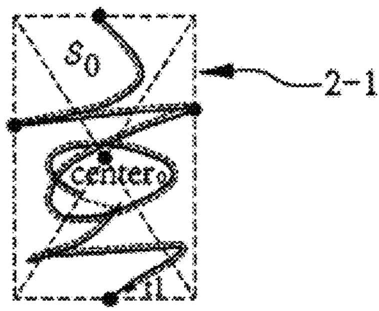
FIGS. 4A to 4D illustrate the method for generating time-division segment blocks of the handwritten signature and characteristics information elements of the time-division segment blocks shown in FIG. 3 in detail.
Figure 4B:
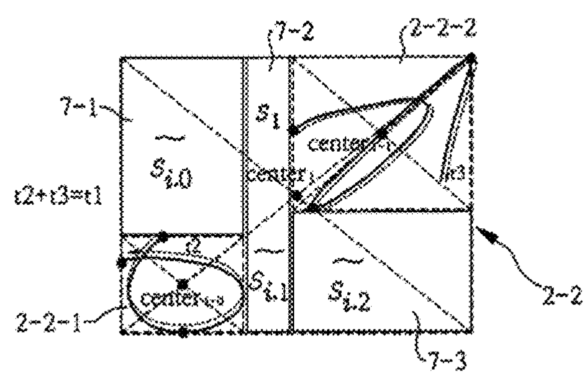
Figure 4C:
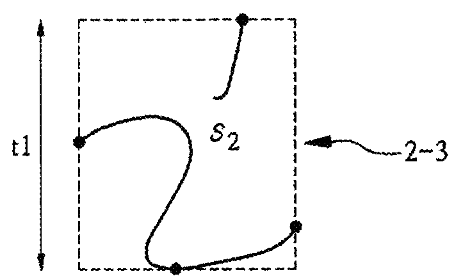
Figure 4D:
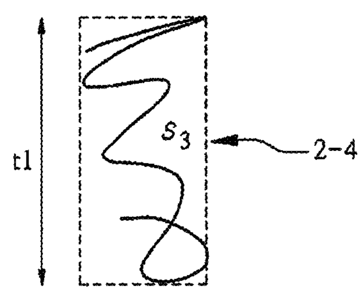

In case that a segment block ($s_i$) contains two or more segment images (hereinafter, referred to as "sub-segments") disjointed from each other as shown in FIG. 4B, the segment block generation unit 651 further generates sub-segment blocks(2-2-1 and 2-2-2) containing respective sub-segments, and generates vacancy blocks (7-1, 7-2, and 7-3) for vacancies generated from the sub-segment blocks (2-2-1 and 2-2-2).

Upon receiving the segment blocks ($s_i$) from the segment block generation unit 651, the segment block position detection unit 652 detects and outputs segment block position information ($p_i$) for edges of each segment block ($s_i$). In case of a rectangular segment block, the segment block position information ($p_i$) may be expressed by Equation 3.

$$p_i=\{p_{i1}(x_{i1},y_{i1}),p_{i2}(x_{i2},y_{i2}),p_{i3}(x_{i3},y_{i3}),p_{i4}(x_{i4},y_{i4})\} \quad \text{[Equation 3]}$$

Also, when the segment block ($s_i$) contains two or more sub-segments disjointed from each other as shown in FIG. 4B, the segment block position detection unit 652 further outputs sub-segment blocks ($\acute{s}_{i.x}$), where 'i' denotes an index for the segment blocks, 'x' denotes an index for the sub-segments, and therefore '$\acute{s}_{i.x}$' denotes a x-th sub-segment of an i-th segment. Also, the segment block position detection unit 652 further outputs sub-segment block position information ($\acute{p}_{i.x}$) for the sub-segment block ($\acute{s}_{i.x}$), and vacancy block position information ($\tilde{p}_{i.y}$) for a vacancy block ($\tilde{s}_{i.y}$) (7-1, 7-2, 7-3) generated from the sub-segment blocks, where 'i' denotes the index for the segment blocks, 'y' denotes an index for the vacancy blocks, and therefore '$\tilde{s}_{i.y}$' denotes a y-th vacancy block of an i-th segment.

In case that the block is rectangular-shaped, the sub-segment block position information ($\acute{p}_{i.x}$) may be expressed by Equation 4.

$$\acute{p}_{i.x}=\{\acute{p}_{i.x1}(x_{i.x1},y_{i.x1}),\acute{p}_{i.x2}(x_{i.x2},y_{i.x2}),\acute{p}_{i.x3}(x_{i.x3},y_{i.x3}),\acute{p}_{i.x4}(x_{i.x4},y_{i.x4})\} \quad \text{[Equation 4]}$$

Thus, in case that the block is rectangular-shaped, overall sub-segment block position information ($\acute{p}_i$) may be expressed by Equation 5.

$$\acute{p}_i=\{\acute{p}_{i.0},\acute{p}_{i.1},\acute{p}_{i.2}, \ldots ,\acute{p}_{i.(k-1)}\} \quad \text{[Equation 5]}$$

Meanwhile, in case that the block is rectangular-shaped, the vacancy block position information ($\tilde{p}_{i.y}$), where 'y' denotes an index corresponding to the number of the vacancy areas, may be expressed by Equation 6.

$$\tilde{p}_{i.y}=\{\tilde{p}_{i.y1}(x_{i.y1},y_{i.y1}),\tilde{p}_{i.y2}(x_{i.y2}),\tilde{p}_{i.y3}(x_{i.y3},y_{i.y3}),\tilde{p}_{i.y4}(x_{i.y4},y_{i.y4})\} \quad \text{[Equation 6]}$$

Thus, in case that the block is rectangular-shaped, overall vacancy block position information ($\tilde{p}_i$) may be expressed by Equation 7.

$$\tilde{p}_i=\{\tilde{p}_{i.0},\tilde{p}_{i.1},\tilde{p}_{i.2}, \ldots ,\tilde{p}_{i.(l-1)}\} \quad \text{[Equation 7]}$$

Therefore, overall segment block position information (P) for the entire handwritten signature, that is, for the entire segments may be expressed by Equation 8.

$$P=\{p_0,p_1,p_2, \ldots ,p_{(n-1)}\}\cup\{\acute{p}_0,\acute{p}_1,\acute{p}_2, \ldots ,\acute{p}_{(n-1)}\}\cup\{\tilde{p}_0,\tilde{p}_1,\tilde{p}_2, \ldots ,\tilde{p}_{(n-}1)\} \quad \text{[Equation 8]}$$

The segment block space characteristics detection unit 653 calculates space areas of the segment blocks ($s_i$) entered from the segment block generation unit 651 and outputs segment block space information ($space_{s_i}$). The segment block space characteristics detection unit 653 further calculates space areas of the sub-segment blocks ($\acute{s}_{i.x}$) ('x' denotes an index corresponding to the number of the sub-segment blocks) and the vacancy blocks ($\tilde{s}_{i.y}$) ('y' denotes an index corresponding to the number of the vacancy blocks), and generates sub-segment block space information (space($\acute{s}_{i.x}$)) and vacancy block space information (space($\tilde{s}_{i.y}$)), respectively. The segment block space characteristics detection unit 653 may output the sub-segment block space information (space($\tilde{s}_{i.x}$)) and the vacancy block space information (space($\tilde{s}_{i.y}$)) along with the segment block space information ($space_{s_i}$) or separately from the segment block space information ($space_{s_i}$).

The space ratio characteristics detection unit 654 receives the segment block space information ($space_{s_i}$) from the segment block space characteristics detection unit 653 and receives the overall handwritten signature block space information ($space_s$) from the overall handwritten signature block characteristics detection unit 660 and outputs segment block space ratio information ($\Delta_i$) by calculating a ratio of the segment block space to the overall handwritten signature block space. In case that there exist a plurality of sub-segment blocks where ($\acute{s}_{i.x}$, where i=1) in a segment block ($s_i$) (2-2) as shown in FIG. 4B, the space ratio characteristics detection unit 654 outputs sub-segment block space ratio information ($\acute{\Delta}_{i.x}$) by calculating a ratio of the sub-segment block space to the segment block space and outputs vacancy block space ratio information ($\tilde{\Delta}_{i.y}$) by calculating a ratio of the vacancy block space to the segment block space.

The segment block characteristics information generation unit 655 receives the segment block position information ($p_i$) from the segment block position detection unit 652, the segment block space information ($space_{s_i}$) from the segment block space characteristics detection unit 653, and the segment block space ratio information ($\Delta_i$) from the space ratio characteristics detection unit 654 in order to generate the segment block characteristics information ($v_i$). After the segment block characteristics information ($v_i$) is generated for all the segment blocks, the segment block characteristics information generation unit 655 generates and outputs the overall segment block characteristics information (V).

The segment block characteristics information ($v_i$) may be expressed by Equation 9.

$$v_i=\{p_i,space_{si},\Delta_i\} \quad \text{[Equation 9]}$$

In case that there exist a plurality of sub-segment blocks ($\acute{s}_{i.x}$) in a segment block (s1) (2-2) as shown in FIG. 4B, the segment block characteristics information generation unit 655 may further include the sub-segment block space ratio information ($\acute{\Delta}_{i.x}$) and vacancy block space ratio information ($\tilde{\Delta}_{i.y}$) in the overall segment block characteristics information (V).

Here, sub-segment block characteristics information for each of the sub-segment blocks ($\acute{v}_{i.x}$) and a set of the sub-segment block characteristics information ($\acute{v}_i$) may be expressed by Equation 10. Also, vacancy block characteristics information for each of the vacancy blocks ($\tilde{v}_{i.y}$) and a set of the vacancy block characteristics information ($\tilde{v}_i$) may be expressed by Equation 11.

$$\acute{v}_{i.x}=\{\acute{p}_{i.x},\text{space}(\acute{s}_{i.x}),\acute{\Delta}_{i.x}\}$$

$$\acute{v}_i=\{\acute{v}_{i.0},\acute{v}_{i.1},\acute{v}_{i.2}, \ldots ,\acute{v}_{i.(k-1)}\} \quad \text{[Equation 10]}$$

(where 'k' denotes the number of sub-segment blocks)

$$\tilde{v}_{i.y}=\{\tilde{p}_{i.y},\text{space}(\tilde{s}_{i.y}),\tilde{\Delta}_{i.y}\}$$

$$\tilde{v}_i=\{\tilde{v}_{i.0},\tilde{v}_{i.1},\tilde{v}_{i.2}, \ldots ,\tilde{v}_{i.(l-1)}\} \quad \text{[Equation 11]}$$

(where 'l' denotes the number of vacancy blocks)

Also, the overall segment block characteristics information (V) may be expressed by Equation 12.

$$V=\{v_0,v_1,v_2, \ldots ,v_{(n-1)}\}\cup\{\acute{v}_0,\acute{v}_1,\acute{v}_2, \ldots ,\acute{v}_{(n-1)}\}\cup\{\tilde{v}_0,\tilde{v}_1,\tilde{v}_2,\tilde{v}_{(n-1)}\} \quad \text{[Equation 12]}$$

Figure 6:
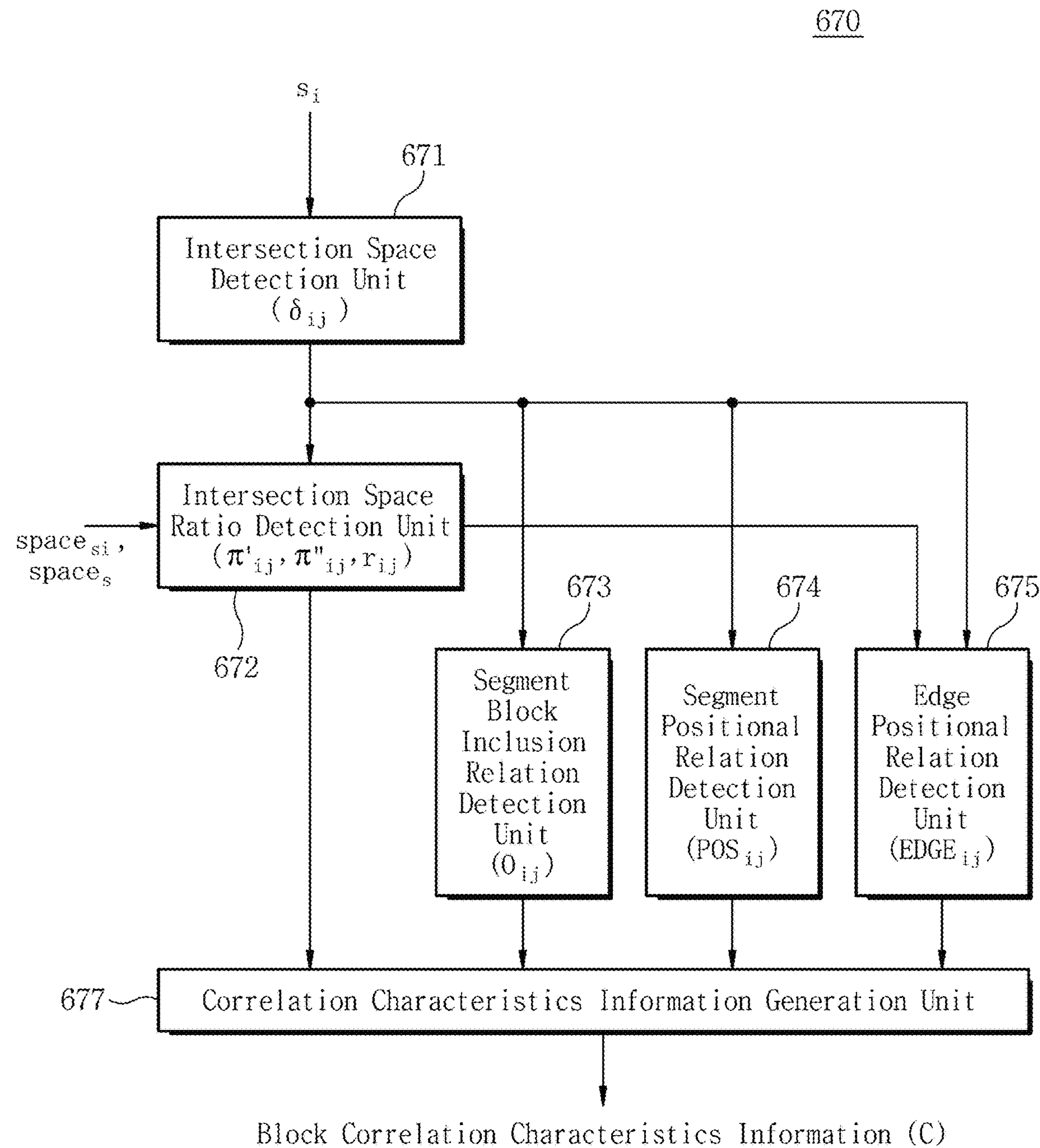
FIG. 6 is a block diagram of a segment block correlation detection unit in the handwritten signature characteristics acquisition unit according to an embodiment of the present disclosure.
Figure 7A:
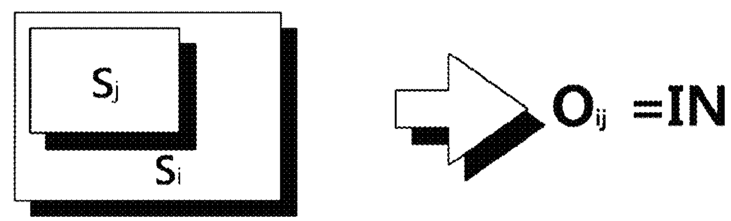
Figure 7B:
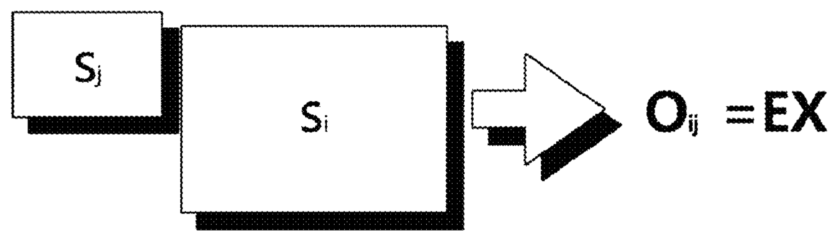
Figure 7C:
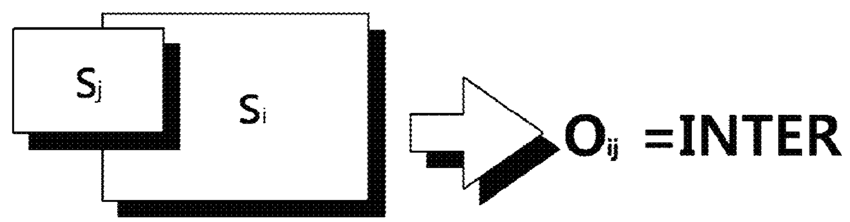

FIG. 6 is a block diagram of a segment block correlation detection unit in the handwritten signature characteristics acquisition unit according to an embodiment of the present disclosure. Also, FIGS. 7A to 7C illustrate a method of generating an inclusive relation of segment blocks which is one of correlation information between the segment blocks according to an embodiment of the present disclosure, FIGS. 8A to 8D illustrate a method of generating a positional relation of segment blocks which is one of correlation information between the segment blocks to according an embodiment of the present disclosure, and FIGS. 9A to 9D illustrate a method of generating an edge positional relation of segment blocks which is one of correlation information between the segment blocks according to an embodiment of the present disclosure. FIG. 10 is a flowchart illustrating a time division segment block-based handwritten signature authentication method according to an embodiment of the present disclosure.

The segment block correlation detection unit 670 includes an intersection space detection unit 671, an intersection space ratio detection unit 672, a segment block inclusion relation detection unit 673, a segment positional relation detection unit 674, an edge positional relation detection unit 675, and a correlation characteristics information generation unit 677.

The intersection space detection unit 671 receives segment blocks($s_i$) from the segment block characteristics detection unit 650, and analyzes the each received segment block ($s_i$) and one or more of adjacent segment blocks($s_j$) to check whether there is an intersection space between the each received segment block ($s_i$) and the adjacent segment blocks($s_j$). If there is any intersection space between the each received segment block ($s_i$) and the adjacent segment blocks ($s_j$), the intersection space detection unit 671 calculates a size of the intersection space between the received segment blocks($s_i$) and the adjacent segment blocks($s_j$), and generates and outputs intersection space information ($\delta_{ij}$).

In the example shown in FIG. 3, the intersection space detection unit 671 checks whether there is an intersection space between the segment block ($s_0$) (2-1) and an adjacent segment block ($s_1$) (2-2). Since there is an intersection space between the segment block ($s_0$) (2-1) and the adjacent segment block ($s_1$) (2-2), the intersection space detection unit 671 calculates the size of the intersection space between the segment block ($s_0$) (2-1) and the adjacent segment block ($s_1$) (2-2) and outputs the intersection space information ($\delta_{01}$).

Similarly, since there is an intersection space between the segment block ($s_1$) and its adjacent segment block ($s_2$), the intersection space detection unit 671 calculates the size of the intersection space between the segment block ($s_1$) and its adjacent segment block ($s_2$) and output the intersection space information ($\delta_{12}$).

Also, the intersection space detection unit 671 outputs the intersection space information ($\delta_{23}$) (6) for the intersection space between the segment block ($s_2$) (2-3) and its adjacent segment block ($s_3$) (2-4).

Meanwhile, when a segment block ($s_i$) contains sub-segments ($\acute{s}_{i.x}$) as shown in FIG. 4B, the intersection space detection unit 671 may check whether there is an intersection space between a sub-segment block ($\acute{s}_{i.a}$) and another sub-segment block ($\acute{s}_{i.b}$) to output sub-intersection space information($\acute{\delta}_{i.ab}$) between the sub-segment block ($\acute{s}_{i.a}$) and the sub-segment block ($\acute{s}_{i.b}$).

The intersection space ratio detection unit 672 receives the segment block space information ($\text{space}_{s_i}$) from the segment block space characteristics detection unit 653 of the segment block characteristics detection unit 650, the overall handwritten signature block space information ($\text{space}_s$) from the overall handwritten signature block characteristics detection unit 660, and the intersection space information (6$_{ij}$) from the intersection space detection unit 671, and generates and outputs intersection space ratio information. The intersection space ratio information includes segment block space ratio information ($\pi'_{ij}$) that is a ratio of the intersection space information ($\delta_{ij}$) to the segment block space ($\text{space}_{s_i}$) in a segment block ($s_i$), adjacent segment block space ratio information ($\pi''_{ij}$) that is a ratio of the intersection space information ($\delta_{ij}$) to an adjacent segment block space ($\text{space}_{s_j}$) in an adjacent segment block ($s_j$), and overall handwritten signature block intersection space ratio information ($r_{ij}$) that is a ratio of the intersection space ($\delta_{ij}$) to the overall handwritten signature block space ($\text{space}_s$) of the overall handwritten signature block (S).

Furthermore, the intersection space ratio detection unit 672 receives sub-segment block space information (space($\acute{s}_{i.a}$) and space($\acute{s}_{i.b}$)) for the sub-segment blocks ($\acute{s}_{i.a}$ and $\acute{s}_{i.b}$) from the segment block space characteristics detection unit 653 of the segment block characteristics detection unit 650, and receives the sub-intersection space information ($\acute{\delta}_{i.ab}$) between a sub-segment block ($\acute{s}_{i.a}$) and a sub-segment block ($\acute{s}_{i.b}$) from the intersection space detection unit 671. Based on these information, the intersection space ratio detection unit 672 may further calculate sub-segment block intersection space ratio information ($\acute{\varepsilon}_{i.ab}$) that is a ratio of sub-intersection space information ($\acute{\delta}_{i.ab}$) to sub-segment block space information (space($\acute{s}_{i.a}$)), adjacent sub-segment block intersection space ratio information ($\varepsilon''_{i.ab}$), and overall sub-segment block intersection space ratio information ($\acute{r}_{i.ab}$).

The segment block inclusion relation detection unit 673 determines an inclusive relation between a segment block ($s_i$) and an adjacent segment block ($s_j$) and outputs segment block inclusion relation information ($O_{ij}$) according to a determination result. The segment block inclusion relation information that is stored according to the present disclosure may have one of three states: inclusion (IN), non-inclusion (exclusion) (EX), and intersection (INTER).

Examples of inclusive relations of segment blocks are illustrated in FIGS. 7A to 7C. When an adjacent segment block ($s_j$) is included in a segment block ($s_i$) as shown in FIG. 7A, the segment block inclusion relation detection unit 673 generates segment block inclusion relation information ($O_{ij}$) having a state indicating "inclusion (IN)." When an adjacent segment block ($s_j$) is located outside a segment block ($s_i$) as shown in FIG. 7B, the segment block inclusion relation detection unit 673 generates segment block inclusion relation information ($O_{ij}$) having a state indicating "non-inclusion (EX)." When an adjacent segment block ($s_j$) partially or totally intersects with a segment block ($s_i$) as shown in FIG. 7C, the segment block inclusion relation detection unit 673 generates segment block inclusion relation information ($O_{ij}$) having a state indicating "intersection (INTER)."

Furthermore, segment block inclusion relation detection unit 673 determines an inclusive relation between a sub-segment block ($\acute{s}_{i.a}$) and an adjacent sub-segment block ($\acute{s}_{i.b}$), in the segment block ($s_i$), and outputs sub-segment block inclusion relation information ($\acute{o}_{i.ab}$) according to a determination result. Similarly to the segment block inclusion relation information ($O_{ij}$), the sub-segment block inclusion relation information ($\acute{o}_{i.ab}$) that is stored according to the present disclosure may have one of three states: inclusion (IN), non-inclusion (exclusion) (EX), and intersection (INTER).

The segment positional relation detection unit 674 generates and outputs segment positional relation information ($POS_{ij}$) which represents position information of adjacent segment blocks ($s_j$) with respect to the segment blocks ($s_i$).

Figure 8A:
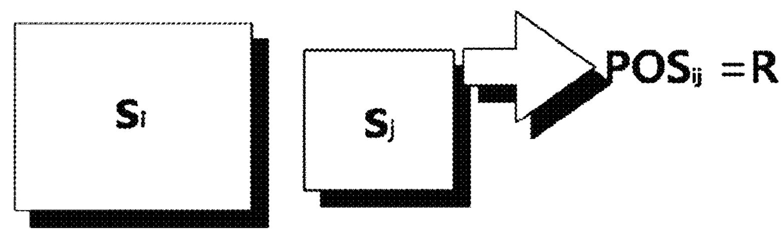
FIGS. 8A to 8D illustrate a method of generating a positional relation of segment blocks which is one of correlation information between the segment blocks to according an embodiment of the present disclosure.
Figure 8B:
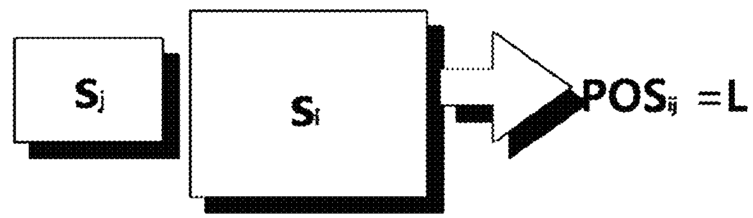
Figure 8C:
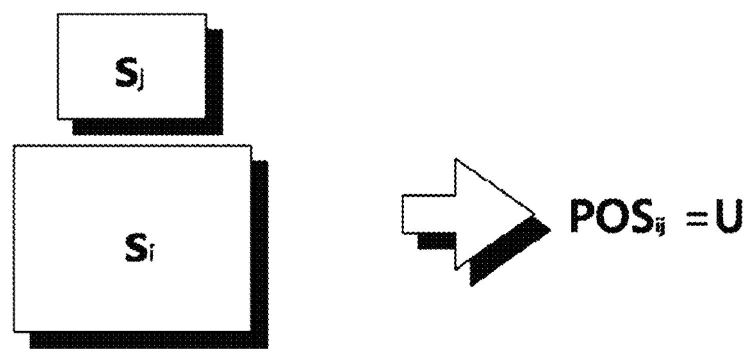
Figure 8D:
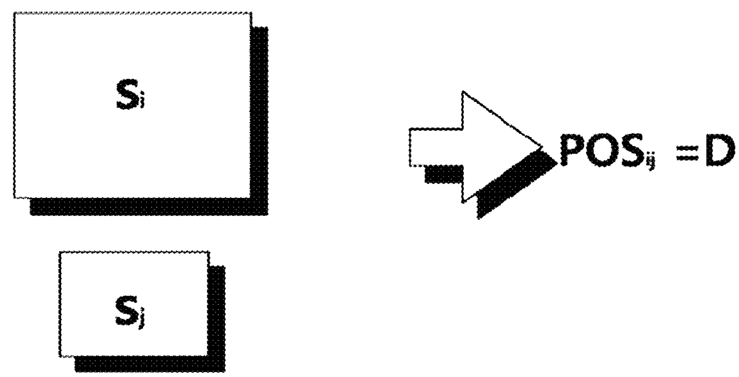

Examples of positional relations of the segment blocks are illustrated in FIGS. 8A to 8D. When an adjacent segment block ($s_j$) is located to the right of a segment block ($s_i$) as shown in FIG. 8A, the segment positional relation detection unit 674 generates and outputs the segment positional relation information ($POS_{ij}$) of "R" representing a right side. When an adjacent segment block ($s_j$) is located to the left of a segment block ($s_i$) as shown in FIG. 8B, the segment positional relation detection unit 674 outputs the segment positional relation information ($POS_{ij}$) of "L" representing a left side. When an adjacent segment block ($s_j$) is located above a segment block ($s_i$) as shown in FIG. 8C, the segment positional relation detection unit 674 outputs the segment positional relation information ($POS_{ij}$) of "U" representing upside. When an adjacent segment block ($s_j$) is located below a segment block ($s_i$) as shown in FIG. 8D, the segment positional relation detection unit 674 outputs the segment positional relation information ($POS_{ij}$) of "D" representing downside.

Also, when an adjacent sub-segment block ($\acute{s}_{i.b}$) is located to the right of a sub-segment block ($\acute{s}_{i.a}$), in a segment block ($s_i$), the segment positional relation detection unit 674 outputs a sub-segment positional relation information ($pos'_{i.ab}$) of "R'" representing the right side. When an adjacent sub-segment block ($\acute{s}_{i.b}$) is located to the left of a sub-segment block ($\acute{s}_{i.a}$), the segment positional relation detection unit 674 outputs the sub-segment positional relation information ($pos'_{i.ab}$) of "L'" representing the left side. When an adjacent sub-segment block ($\acute{s}_{i.b}$) is located above a sub-segment block ($\acute{s}_{i.a}$), the segment positional relation detection unit 674 outputs the sub-segment positional relation information ($pos'_{i.ab}$) of "U'" representing upside. When an adjacent sub-segment block ($\acute{s}_{i.b}$) is located below a sub-segment block ($\acute{s}_{i.a}$), the segment positional relation detection unit 674 outputs the sub-segment positional relation information ($pos'_{i.ab}$) of "D" representing downside.

An edge positional relation detection unit 675 receives intersection information between a segment block ($s_i$) and an adjacent segment block ($s_j$) from the intersection space ratio detection unit 672. If a segment block ($s_i$) intersects with an adjacent segment block ($s_j$), an edge positional relation detection unit 675 determines which edge of the segment block ($s_i$) intersects with the adjacent segment block ($s_j$), and outputs segment block edge positional relation information ($EDGE_{ij}$) that represents the edge of the segment block ($s_i$) intersecting with the adjacent segment block ($s_j$).

Figure 9A:
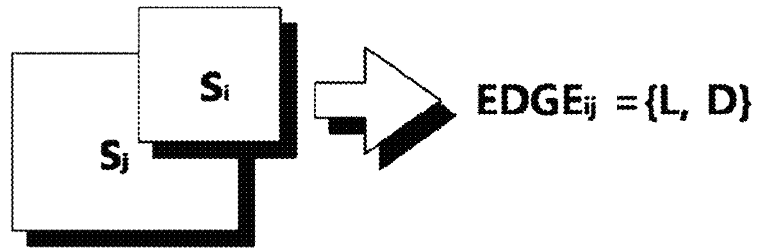
FIGS. 9A to 9D illustrate a method of generating an edge positional relation of segment blocks which is one of correlation information between the segment blocks according to an embodiment of the present disclosure.

Examples of edge positional relations of segment blocks are illustrated in FIGS. 9A to 9D. When an adjacent segment block ($s_j$) is located in a down-left position of a segment block ($s_i$) and the left and bottom edges of the segment block ($s_i$) intersects with the adjacent segment block ($s_j$) as shown in FIG. 9A, an edge positional relation detection unit 675 outputs the edge positional relation information ($EDGE_{ij}$) of {L, D} which represents that the left and bottom edges of the segment block ($s_i$) intersects with the adjacent segment block ($s_j$).

Figure 9B:
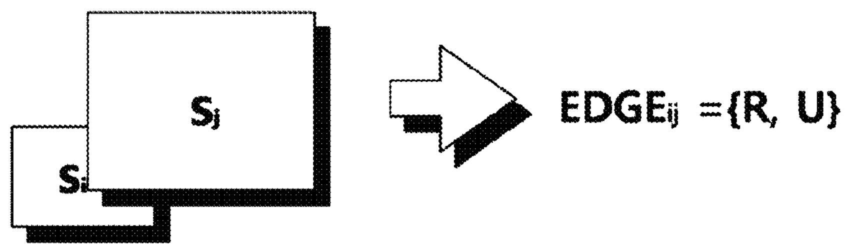
Figure 10:
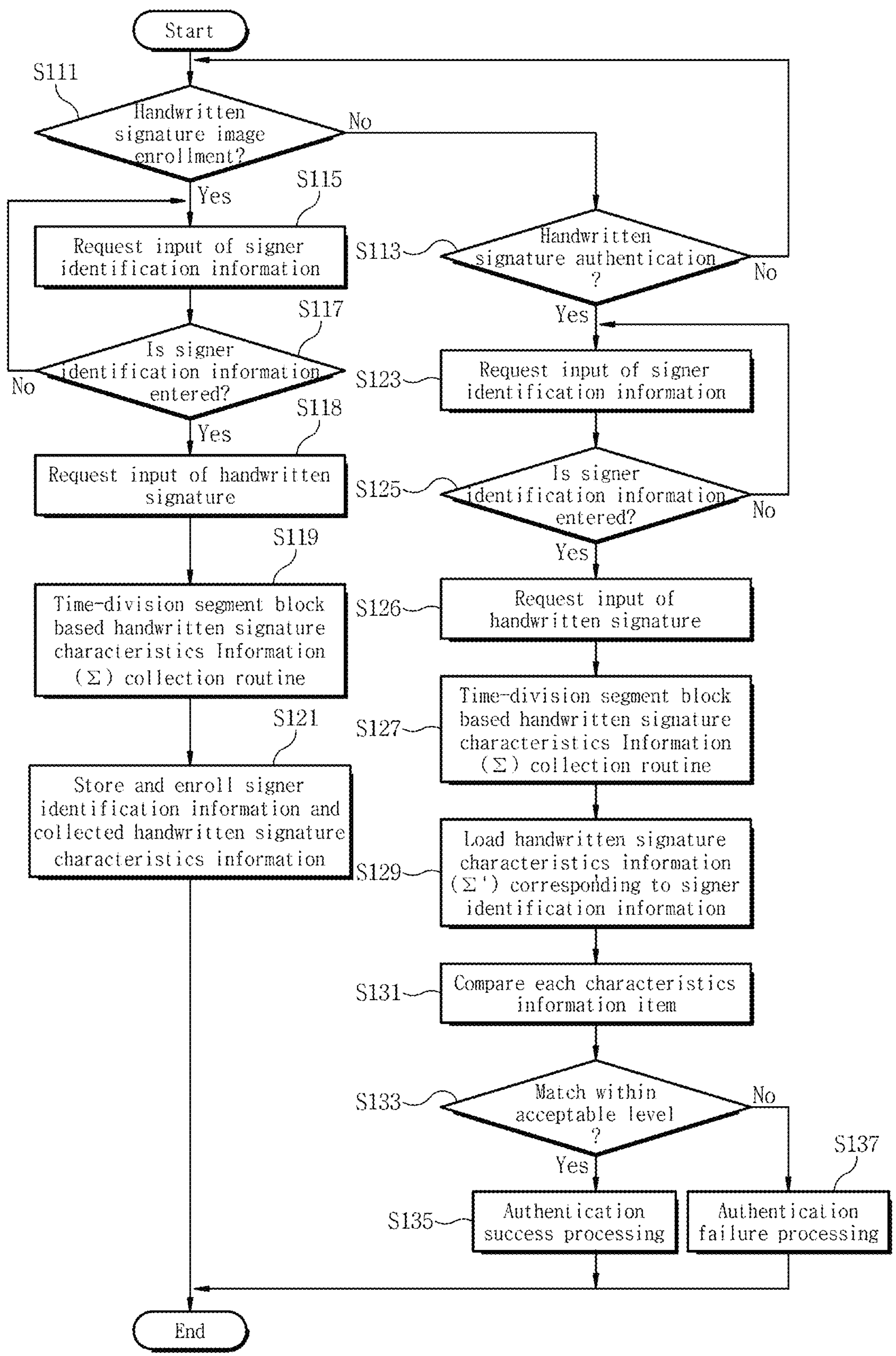
FIG. 10 is a flowchart illustrating a time division segment block-based handwritten signature authentication method according to an embodiment of the present disclosure.

When an adjacent segment block ($s_j$) is located in an up-right position of a segment block ($s_i$) and the right and top edges of the segment block ($s_i$) intersects with the adjacent segment block ($s_j$) as shown in FIG. 9B, an edge positional relation detection unit 675 outputs the edge positional relation information ($EDGE_{ij}$) of {R, U}.

Figure 9C:
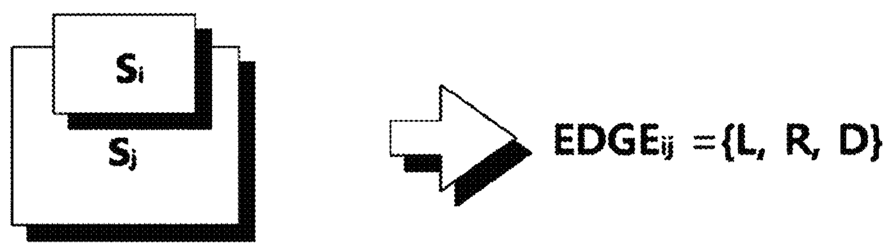

When an adjacent segment block ($s_j$) is located in a downward position of a segment block ($s_i$) and the left, right, and bottom edges of the segment block ($s_i$) intersects with the adjacent segment block ($s_j$) as shown in FIG. 9C, an edge positional relation detection unit 675 outputs the edge positional relation information ($EDGE_{ij}$) of {L, R, D}.

Figure 9D:
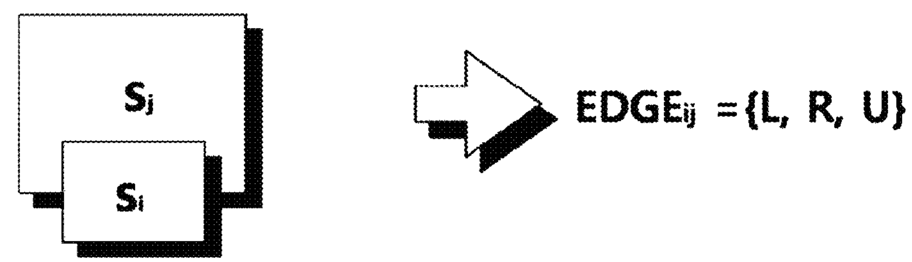

When an adjacent segment block ($s_j$) is located in a upward position of a segment block ($s_i$) and the left, right, and top edges of the segment block ($s_i$) intersects with the adjacent segment block ($s_j$) as shown in FIG. 9D, an edge positional relation detection unit 675 outputs the edge positional relation information ($EDGE_{ij}$) of {L, R, U}.

Furthermore, an edge positional relation detection unit 675 receives intersection information between a sub-segment block ($\acute{s}_{i.a}$) and an adjacent sub-segment block ($\acute{s}_{i.b}$), in the segment block ($s_i$), from the intersection space ratio detection unit 672. If the sub-segment block ($\acute{s}_{i.a}$) intersects or overlaps with the adjacent sub-segment block ($\acute{s}_{i.b}$), an edge positional relation detection unit 675 may determine which edge of the sub-segment block ($\acute{s}_{i.a}$) intersects with the adjacent sub-segment block ($\acute{s}_{i.b}$) and outputs sub-segment block edge positional relation information ($edge'_{i.ab}$) that represents the edge of the sub-segment block ($\acute{s}_{i.a}$) intersecting with the adjacent sub-segment block ($\acute{s}_{i.b}$).

When an adjacent sub-segment block ($\acute{s}_{i.b}$) is located in the down-left position of a sub-segment block ($\acute{s}_{i.a}$) and the left and bottom edges of the sub-segment block ($\acute{s}_{i.a}$) intersects with the adjacent sub-segment block ($\acute{s}_{b}$) as shown in FIG. 9A, an edge positional relation detection unit 675 outputs sub-segment block edge positional relation information ($edge'_{i.ab}$) of {L, D}.

When an adjacent sub-segment block ($\acute{s}_{i.b}$) is located in the up-right position of a sub-segment block ($\acute{s}_{i.a}$) and the right and top edges of the sub-segment block ($\acute{s}_{i.a}$) intersects with the adjacent sub-segment block ($\acute{s}_{i.b}$) as shown in FIG. 9B, an edge positional relation detection unit 675 outputs sub-segment block edge positional relation information ($edge'_{i.ab}$) of {R, U}.

When an adjacent sub-segment block ($\acute{s}_{i.b}$) is located in the downward position of a sub-segment block ($\acute{s}_{i.a}$) and the left, right, and bottom edges of the sub-segment block ($\acute{s}_{i.a}$) intersects with the adjacent sub-segment block ($\acute{s}_{i.b}$) as shown in FIG. 9C, an edge positional relation detection unit 675 outputs the sub-segment block edge positional relation information ($edge'_{i.ab}$) of {L, R, D}.

When an adjacent sub-segment block ($\acute{s}_{i.b}$) is located in the upward position of a sub-segment block ($\acute{s}_{i.a}$) and the left, right, and top edges of the sub-segment block ($\acute{s}_{i.a}$) intersects with the adjacent sub-segment block ($\acute{s}_{i.b}$) as shown in FIG. 9D, an edge positional relation detection unit 675 outputs the sub-segment block edge positional relation information ($edge'_{i.ab}$) of {L, R, U}.

The correlation characteristics information generation unit 677 receives intersection space ratio information, segment block inclusion relation information ($0_{ij}$), segment block positional relation information ($POS_{ij}$), and segment block edge positional relation information ($EDGE_{ij}$) from the intersection space ratio detection unit 672, the segment block inclusion relation detection unit 673, the segment positional relation detection unit 674, and an edge positional relation detection unit 675, respectively, and generates correlation characteristics information ($c_{ij}$) including those information. After the correlation characteristics information ($c_{ij}$) is generated for all segment blocks, the correlation characteristics information generation unit 677 generates and outputs overall block correlation characteristics information (C).

The correlation characteristics information ($c_{ij}$) and the overall block correlation characteristics information (C) may be expressed by Equations 13 and 14, respectively.

$$c_{ij}=\{\delta_{ij},\pi'_{ij},\pi''_{ij},r_{ij},O_{ij},POS_{ij},\mathrm{EDGE}_{ij}\} \quad \text{[Equation 13]}$$

$$C=\{c_{ij}|i=0,1,2,\ldots,(n-1),j=0,1,2,\ldots,(n-1)\} \quad \text{[Equation 14]}$$

Meanwhile, when a segment block ($s_i$) contains sub-segments as shown in FIG. 4B, the correlation characteristics information generation unit 677 receives sub-segment block space ratio information ($\acute{\Delta}_{i.x}$), sub-segment block intersection space ratio information ($\acute{\varepsilon}_{i.ab}$), adjacent sub-segment block intersection space ratio information ($\varepsilon''_{i.ab}$), overall sub-segment block intersection space ratio information ($\acute{r}_{i.ab}$), sub-segment block inclusion relation information ($\acute{o}_{i.ab}$), sub-segment block positional relation information ($pos'_{i.ab}$), and sub-segment block edge positional relation information ($edge'_{i.ab}$) from the intersection space ratio detection unit 672, the segment block inclusion relation detection unit 673, the segment positional relation detection unit 674, and an edge positional relation detection unit 675, and generates sub-segment block correlation characteristics information ($\acute{c}_i$) including those information. After the sub-segment block correlation characteristics information ($\acute{c}_i$) is generated for all the sub-segment blocks, the correlation characteristics information generation unit 677 includes the sub-segment block correlation characteristics information ($\acute{c}_i$) to the overall block correlation characteristics information (C).

The sub-segment block correlation characteristics information ($\acute{c}_i$) may be expressed by Equation 15, and the overall block correlation characteristics information (C) including the sub-segment block correlation characteristics information ($\acute{c}_i$) may be expressed by Equation 16.

$$\hat{c}_i=\{\acute{\delta}_{i.ab},\in'_{i.ab},\in''_{i.ab},\acute{r}_{i.ab},\acute{o}_{i.ab},pos'_{i.ab},\mathrm{edge}'_{i.ab}\} \quad \text{[Equation 15]}$$

$$C=\{c_{ij}|i=0,1,2,\ldots,(n-1),j=0,1,2,\ldots,(n-1)\}\cup\{\acute{c}_0,\acute{c}_1,\acute{c}_2,\ldots\acute{c}_{(n-1)}\} \quad \text{[Equation 16]}$$

FIG. 10 is a flowchart illustrating a time division segment block-based handwritten signature authentication method according to an embodiment of the present disclosure.

Referring to FIG. 10, the control unit 510 monitors whether handwritten signature enrollment is requested by a command for handwritten signature enrollment through the input unit 200 (S111) or whether handwritten signature authentication is requested by a command for handwritten signature authentication (S113).

When the handwritten signature enrollment is requested, the control unit 510 requests the input of the signer's identification information (S115) and monitors whether the signer identification information is entered (S117).

After the signer identification information is entered, the control unit 510 requests the signer to handwrite a signature (S118).

Afterwards, the control unit 510 collects time-division segment block based handwritten signature characteristics information (Σ) by performing a time-division segment block based handwritten signature characteristics information acquisition routine (S119), maps the collected time-division segment block based handwritten signature characteristics information (Σ) to the signer identification information, and stores the collected time-division segment block-based handwritten signature characteristics information (Σ) in the enrollment unit 100 (S121).

On the other hand, when the handwritten signature authentication is requested, the control unit 510 requests the input of the signer's identification information (S123) and monitors whether the signer identification information is entered (S125).

After the signer identification information is entered, the control unit 510 requests the signer to handwrite a signature through the output unit 300 (S126).

Afterwards, the control unit 510 collects time-division segment block based handwritten signature characteristics information (Σ) by performing a time-division segment block-based handwritten signature characteristics information acquisition routine through the handwritten signature characteristics extraction unit 520 (S127), loads, from the enrollment unit 100, the enrolled handwritten signature characteristics information (Σ') that corresponds to the input signer identification information through a handwritten signature segment block authentication unit 560 (S129).

After the enrolled handwritten signature characteristics information (Σ') is loaded, the control unit 510 compares the enrolled handwritten signature characteristics information (Σ') with the received handwritten signature characteristics information (Σ) through the handwritten signature segment block authentication unit 560 (S131). The control unit 510 may further compare the enrolled handwritten signature behavioral characteristics information with the received handwritten signature behavioral characteristics information.

The control unit 510 determines, through the handwritten signature segment block authentication unit 560, whether the match rate for each characteristics items reaches the predetermined match rate (S133). The control unit 510 conducts authentication success processing if the match rate is greater than or equal to the predetermined match rate (S135), and conducts authentication failure processing if the match rate is below the predetermined match rate (S137).

Figure 11A:
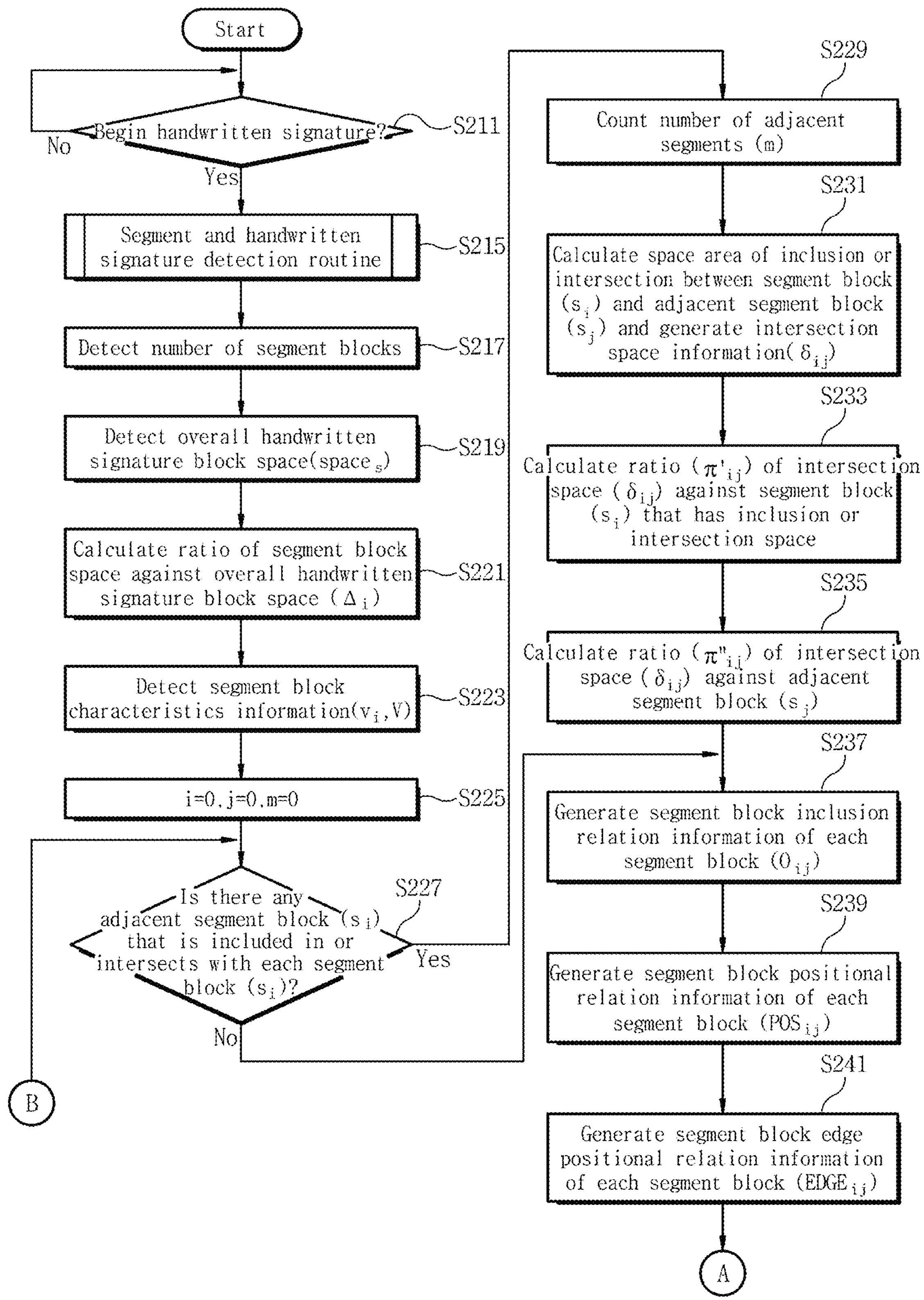
FIGS. 11A and 11B are flowcharts illustrating a method of collecting handwritten signature characteristics data in the time division segment block-based handwritten signature authentication method according to an embodiment of the present disclosure.
Figure 11B:
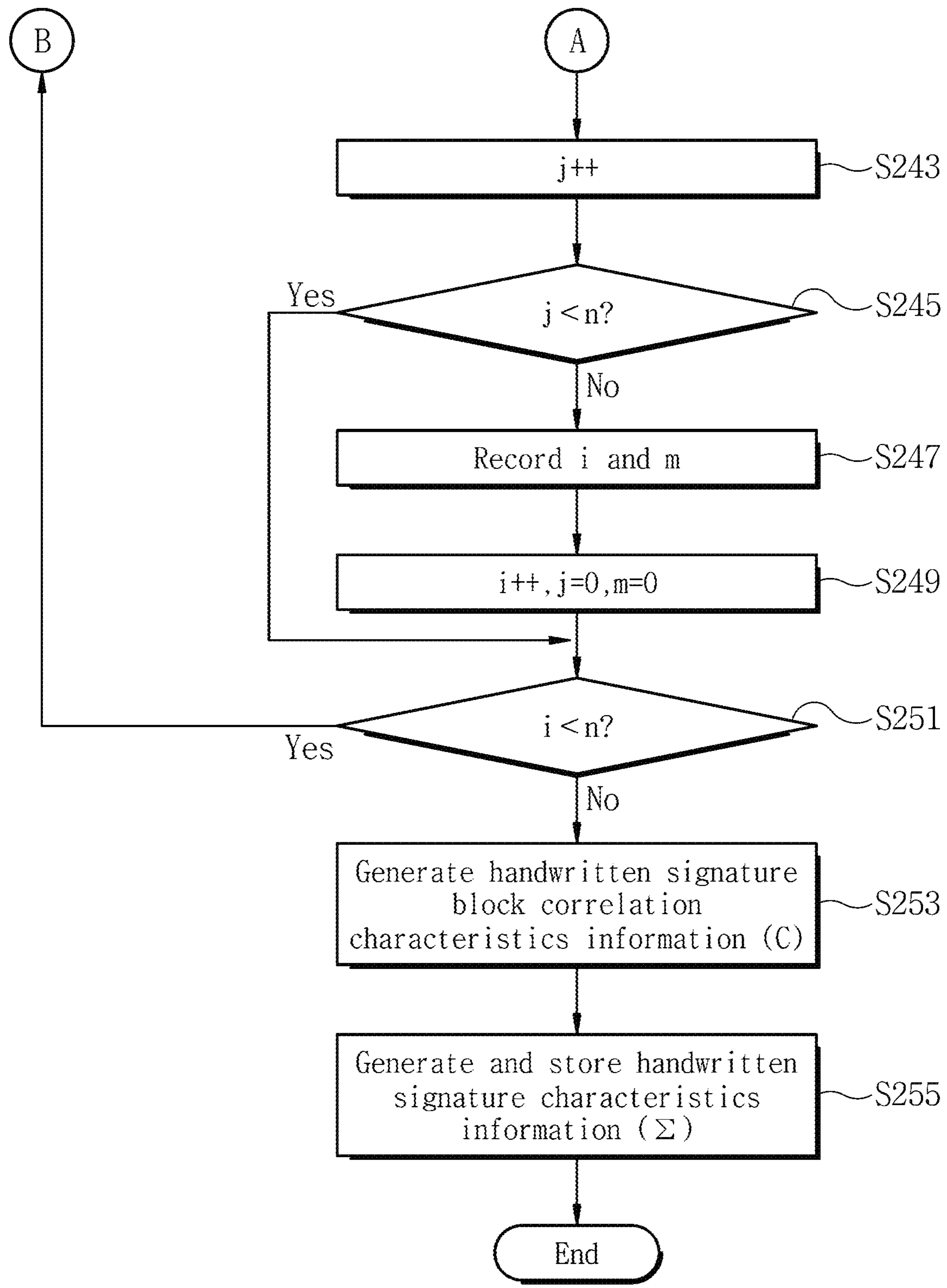

FIGS. 11A and 11B are flowcharts illustrating a method of collecting handwritten signature characteristics data in the time-division segment block based handwritten signature authentication method according to an embodiment of the present disclosure.

The control unit 510 monitors whether the touch data, which is the handwritten signature input data, begins to be entered from the touch input unit 420, through at least one of a handwritten signature tracking unit 530, a handwritten signature image acquisition unit 540, and a handwritten signature characteristics acquisition unit 550 (S211).

When monitoring the input of the touch data is started, the control unit 510 detects segments, segment blocks, sub-segments, sub-segment blocks, and vacancy blocks by performing a segment and handwritten signature detection routine, and detects and stores information including corresponding segment images, sub-segment images, a handwritten signature image, segment blocks, sub-segment blocks, and overall handwritten signature block (S) (S125). The segment and handwritten signature detection routine will be described below in detail with reference to FIGS. 12 and 13.

After the overall handwritten signature block (S) is generated, the control unit 510 detects and stores the number of the segment blocks (n) (S217).

Also, the control unit 510 calculates space area of the overall handwritten signature block (S) to determine the overall handwritten signature block space information ($space_s$) (S219).

After the overall handwritten signature block space information ($space_s$) is generated, the control unit 510 calculates a ratio of the segment block space ($space_{s_i}$) to the overall handwritten signature block space information ($space_s$) to determine segment block space ratio information ($\Delta_i$), sub-segment block space ratio information ($\acute{\Delta}_{i.x}$), and vacancy block space ratio information ($\tilde{\Delta}_{i.y}$) (S221).

When the segment block space ratio information ($\Delta_i$), sub-segment block space characteristics information ($\acute{v}_{i.x}$, $\acute{v}_i$), and vacancy block characteristics information ($\tilde{v}_{i.y}$, $\tilde{v}_i$) are generated (S221), the control unit 510 generates segment block characteristics information ($v_i$) and overall segment block characteristics information (V) (S223).

The control unit 510 initializes variables (i, j, m, and so on) (S225).

When the overall segment block characteristics information (V) is generated and the variables are initialized, the control unit 510 checks whether there is any adjacent segment block ($s_j$) that intersects with each of the segment blocks($s_i$) (S227).

If there exists the adjacent segment blocks ($s_j$) that intersects with each of the segment blocks($s_i$), the control unit 510 counts the number (m) of the adjacent segment blocks ($s_j$) (S229).

If there is an adjacent segment ($s_j$) interse/cting with or included in the segment block ($s_i$), the control unit 510 generates intersection space information ($\delta_{ij}$) by calculating the space area of the included or intersecting space formed by a segment block (si) and an adjacent segment bock ($s_j$) (S231).

When intersection space information ($\delta_{ij}$) is generated, the control unit 510 generates segment block intersection space ratio information ($\pi'_{ij}$), which is the ratio of the intersection space ($\delta_{ij}$) to the space of the segment block ($s_i$) (S233).

Furthermore, the control unit 510 generates adjacent segment block intersection space ratio information ($\pi''_{ij}$), which is the ratio of the intersection space ($\delta_{ij}$) to the space of the adjacent segment block ($s_j$) having the intersection space with the segment block ($s_i$) (S235)

The control unit 510 generates segment block inclusion relation information ($O_{ij}$) that represents whether an adjacent segment block ($s_j$) is included in each segment block ($s_i$) or not, segment block positional relation information ($POS_{ij}$) that represents relative position information of all adjacent segment blocks($s_j$) based on each segment block ($s_i$), and segment block edge positional relation information ($EDGE_{ij}$) that represents at which edge of a segment block ($s_i$) intersects with an adjacent segment block ($s_j$) (S237, S239, and S241).

Through the operations S225 to S251, the control unit 510 generates block correlation characteristics information ($ci_{ij}$) on all adjacent segment blocks ($s_j$: j<n) based on each of the segment blocks ($s_i$: i<n).

When the information is generated, the control unit 510 generates block correlation characteristics information (C) (S253), and finally generates the handwritten signature characteristics information ($\Sigma$) including all of the information described above to store in the enrollment unit 100 (S255).

The generation of the time-division segment block according to an embodiment of the present disclosure may be performed in two ways: a real-time segment detection method in which the segments are detected by a predetermined time slice from the entered touch data, and a segment division detection method in which the segments are detected by a predetermined time slice after an entire handwritten signature is acquired.

Figure 12:
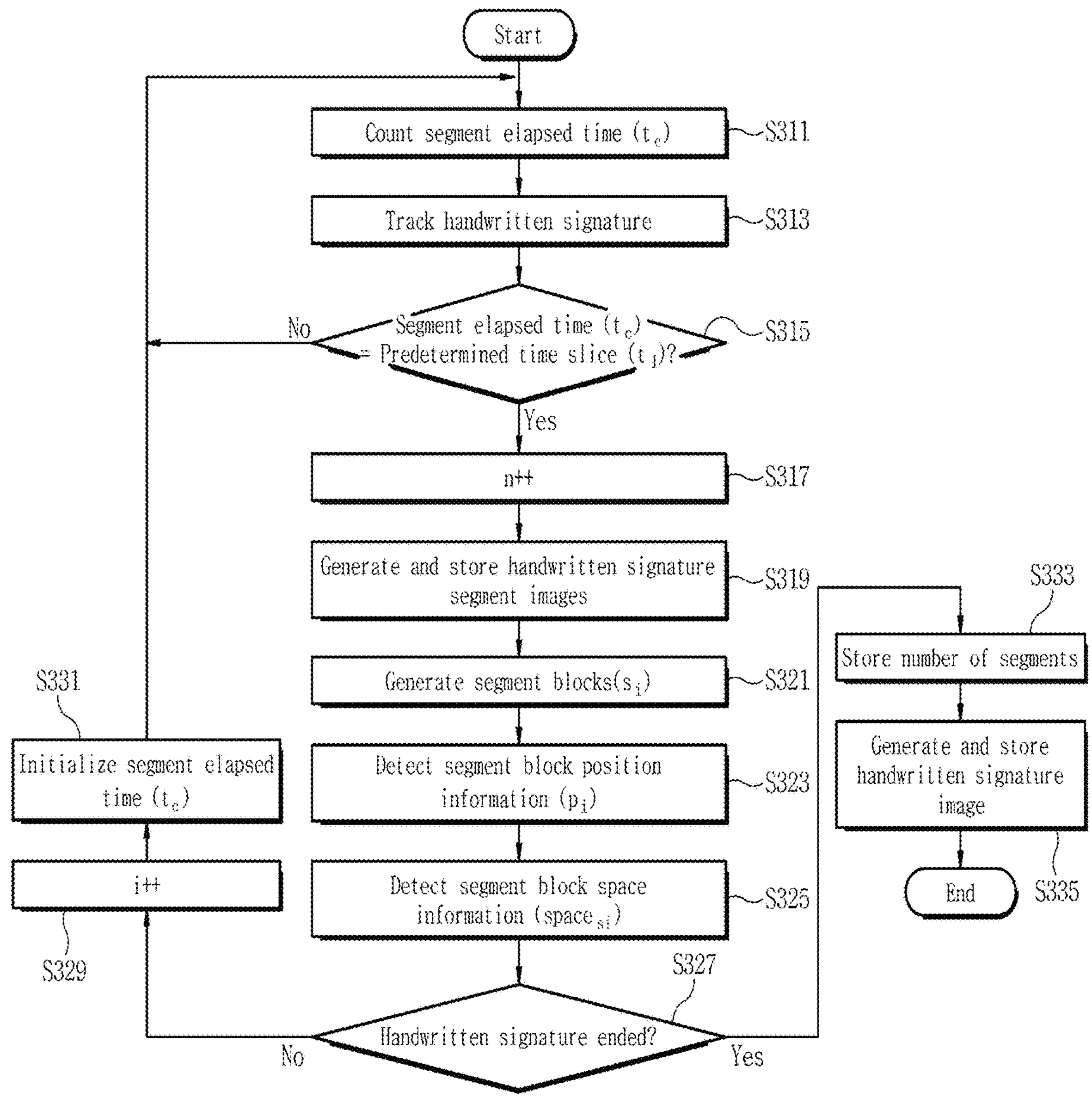
FIG. 12 is a flowchart illustrating a method of generating a time-division segment block according to a first embodiment of the present disclosure.

FIG. 12 is a flowchart illustrating a method of generating time-division segment blocks according to a first embodiment, in which the segment blocks are generated in the real-time segment detection method.

Referring to FIG. 12, the control unit 510 counts the segment elapsed time ($t_c$) through the time-division segment detection unit 630 (S311).

When the segment elapsed time ($t_c$) begins to be counted, the control unit 510 starts tracking of the handwritten signature by using the entered touch data (S313).

While the handwritten signature is being tracked, the control unit 510 determines whether the segment elapsed time ($t_c$) reaches a predetermined time slice ($t_1$) (S315).

If the segment elapsed time ($t_c$) reaches the predetermined time slice ($t_1$), the control unit 510 counts the number of the segments (n) (S317).

After counting the number of the segments, the control unit 510 generates and stores the handwritten signature segment images (S319). Each of the segment images is generated based on the entered touch data by tracking the handwritten signature from the segment start point to the predetermined time slice ($t_1$) as shown in FIGS. 4A to 4D.

After the handwritten signature segment images are generated, the control unit 510 generates segment blocks ($s_i$) (S321). The segment blocks($s_i$) includes a top position (top), a bottom position (bottom), a leftmost position (left), and a rightmost position (right) as shown in FIG. 4A, and is formed to have a least area.

In case that the segment defined in the predetermined time slice ($t_1$) is composed of two sub-segments as shown in FIG. 4B, the segment block ($s_i$), similar to FIG. 4A, is formed to include a top point (top) which is the highest point of the two sub-segments, a bottom point (bottom) which is the lowest point of two sub-segments, a leftmost point (left) of the two sub-segments, and a rightmost point (right) of the two sub-segments, and is also formed to have a least area. Here, the control unit 510 may generate sub-segment blocks ($\hat{s}_{i.x}$=1) for the sub-segments. Also, the vacancy blocks ($\tilde{s}_{i.y}$, i=1) shown in FIG. 4B may be further detected as the handwritten signature information. As shown in FIGS. 4A to 4D, the vacancy blocks ($\tilde{s}_{i.y}$, i=1) may be detected by detecting a vacancy block ($\tilde{s}_{i.1}$, i=1) existing between a sub-segment block ($\tilde{s}_{i.a}$, i=1, a=0) and another sub-segment block ($\tilde{s}_{i.b}$, i=1, b=1) first, and then detecting vacancy blocks ($\tilde{s}_{i.0}$, $\tilde{s}_{i.2}$, i=1) which are located at the top, bottom, left, and right of the sub-segment block that does not contain the vacancy block ($\tilde{s}_{i.1}$, i=1). Though the vacancy block ($\tilde{s}_{i.1}$, i=1) is formed in the vertical direction in the example of FIG. 4B, the vacancy block may be formed in the horizontal direction, or both the vertical and horizontal directions as well. When the vacancy blocks are formed in both the vertical and horizontal directions, it is recommended to set a reference direction as a rule and define the vacancy block ($\tilde{s}_{i.1}$, i=1) in terms of the reference direction.

After the generation of the segment blocks is completed as described above, the control unit 510 detects the segment block position information ($p_i$) (S323).

Then, the control unit 510 detects and calculates the segment block space information ($space_{s_i}$) (S325).

Whenever the detection of the segment block space information is completed for one segment, the control unit 510 checks whether the signing of the handwritten signature is terminated through the handwritten signature end detection unit 620 (S327).

If the signing of the handwritten signature is not terminated, the control unit 510 increments the segment index variable (i) by one (S329), initializes the segment elapsed time (tc) (S331), and repeat the process from the operation S311.

Even though it is shown in FIG. 12 that the termination of the signing is confirmed after the operations the S321, S323, and S325 are performed, if the touch data is continuously entered (which means that the signing of the handwritten signature is not terminated), the segment detection may be performed by initializing the segment index variable (i) and counting the segment elapsed time ($t_c$) after the predetermined time slice ($t_1$) is passed.

Upon completion of the signing of the handwritten signature, the control unit 510 stores the counted number of segments (n) (S333), and generates and stores a handwritten signature image (S335).

Figure 13:
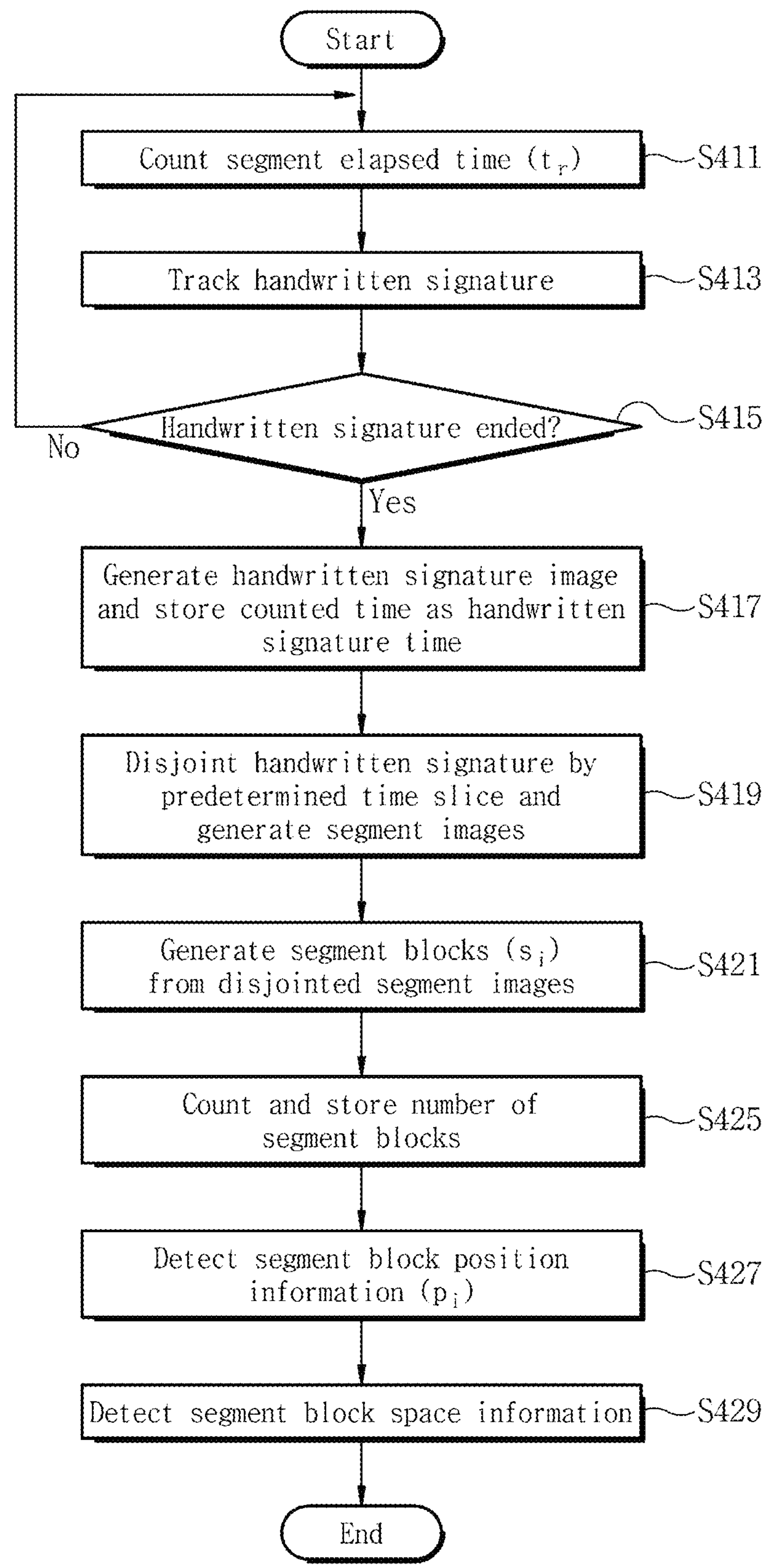
FIG. 13 is a flowchart illustrating a method of generating a time-division segment block according to a second embodiment of the present disclosure.

FIG. 13 is a flowchart illustrating a method of generating a time-division segment block according to a second embodiment, in which the segment block is generated in the segment division detection method.

Referring to FIG. 13, the control unit 510 counts handwritten signature elapsed time ($t_r$) when the signing of the handwritten signature is initiated (S411).

When the handwritten signature elapsed time ($t_r$) begins to be counted, the control unit 510 starts tracking of the handwritten signature (S413).

While the handwritten signature is tracked, the control unit 510 continuously checks whether the signing of the handwritten signature is term inated(S415). When the signing of the handwritten signature is terminated, the control unit 510 generates the handwritten signature image and stores the handwritten signature elapsed time ($t_r$) with timestamp information (S417).

After the handwritten signature image is generated, the control unit 510 divides the handwritten signature image stored along with the timestamp information by a predetermined time slice to generate and store segment images (S419).

After the segment images are generated, the control unit 510 generates and stores segment blocks ($s_i$) for each of the segment images (S421).

After generating the segment blocks ($s_i$), the control unit 510 counts the number of segment blocks and stores the counted number of segments (S425).

The control unit 510 detects and stores the segment block position information and the segment block space information of each segment block (S427, S429).

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope as defined by the following claims.

The invention claimed is:

1. A time-division segment block-based handwritten signature authentication system, comprising:

a handwritten signature input unit that includes a touch input unit configured to output touch data, as a handwritten signature input data, including position data and pressure data for positions that are touched by a signer for handwritten signature;

an enrollment unit configured to enroll handwritten signature characteristics information of each signer; and a handwritten signature authentication unit configured to count time when the handwritten signature input data is entered, store the handwritten signature input data with timestamp information, recognize segments divided by a time slice ($t_1$) from the handwritten signature input data and the timestamp information, generate a handwritten signature image and segment images by identifying a handwritten signature, generate a handwritten signature block containing the handwritten signature image and segment blocks containing the segment images, collect handwritten signature characteristics information (Σ) including handwritten signature block information, each segment block information, correlation information between the segment blocks, and correlation information between each segment block and the handwritten signature block, map collected handwritten signature characteristics information to identification information of the signer, enroll the collected handwritten signature characteristics information in the enrollment unit, collect handwritten signature characteristics information (Σ) including correlation information between the segment blocks and correlation information between each segment block and the handwritten signature block from the touch data entered through the touch input unit of the handwritten signature input unit upon request for handwritten signature authentication, load enrolled handwritten signature characteristics information (Σ') that corresponds with the identification information of the signer who requests handwritten signature authentication, and perform a segment-block-based handwritten signature authentication according to a match rate by comparing the enrolled handwritten signature characteristics information (Σ') with the collected handwritten signature characteristics information (Σ).

2. The handwritten signature authentication system of claim 1, wherein the handwritten signature authentication unit comprises:

a handwritten signature characteristics extraction unit configured to count time when the handwritten signature input data is entered, store the handwritten signature input data with timestamp information, recognize segments divided by a time slice ($t_1$) from the handwritten signature input data and timestamp information, generate the handwritten signature image and the segment images by identifying the handwritten signature, generate the handwritten signature block containing the handwritten signature image and the segment blocks containing the segment images, and extract the handwritten signature characteristics information (Σ) including overall handwritten signature block characteristics information (Q), overall segment block characteristics information (V), and block correlation characteristics information (C);

a handwritten signature segment block authentication unit configured to perform a handwritten signature authentication according to each predetermined match rate by comparing the handwritten signature characteristics information ($\Sigma$) extracted from the handwritten signature characteristics extraction unit with the pre-enrolled handwritten signature characteristics information ($\Sigma'$); and a control unit configured to save and enroll the handwritten signature characteristics information, as extracted through the handwritten signature characteristics extraction unit, to the enrollment unit at time of request for enrollment, and perform handwritten signature authentication by controlling the handwritten signature segment block authentication unit at time of request for handwritten signature authentication.

3. The handwritten signature authentication system of claim 1, wherein the handwritten signature characteristics extraction unit comprises:

a handwritten signature start detection unit configured to detect a start of the handwritten signature from the touch data;

a handwritten signature end detection unit configured to detect an end of the handwritten signature designating a final touch data input point as an end point of the handwritten signature when there is no touch data input for a certain period of time;

a time-division segment detection unit configured to count time when the touch data is entered, store the touch data with timestamp information, recognize segments divided by a time slice ($t_1$) from the touch data and the timestamp information, and generate and output the handwritten signature image and the segment images by identifying the handwritten signature;

a segment count unit configured to count a number of the segments detected by the time-division segment detection unit;

a segment block characteristics detection unit configured to receive the segment images as input, create each segment block ($s_i$) including the corresponding segment image, generate each segment block characteristics information ($v_i$) on the created segment block ($s_i$), and generate and output overall segment block characteristics information (V) including all of the generated segment block characteristics information ($v_i$);

an overall handwritten signature block characteristics detection unit configured to generate a handwritten signature block (S) including the handwritten signature image, and generate and output overall handwritten signature block characteristics information (Q) on the handwritten signature block (S);

a segment block correlation detection unit configured to generate and output the block correlation characteristics information (C) according to the correlations between the segment blocks and the correlations between the overall handwritten signature block and each segment block; and a handwritten signature characteristics acquisition unit including a handwritten signature block characteristics information generation unit configured to generate and output the handwritten signature characteristics information ($\Sigma$) including the overall handwritten signature block characteristics information (Q), the overall segment block characteristics information (V), and the block correlation characteristics information (C).

4. The handwritten signature authentication system of claim 3, wherein the overall handwritten signature block characteristics detection unit further generates and outputs overall handwritten signature block space information ($space_s$) by calculating space area of the handwritten signature block (S), wherein the segment block characteristics detection unit comprises:

a segment block generation unit configured to receive the segment images as input, and generate and output the segment block ($s_i$) including the corresponding segment image;

a segment block position detection unit configured to receive the segment block ($s_i$) as input, and detect and output segment block position information ($p_i$) which is information on all edges of the segment block;

a segment block space characteristics detection unit configured to receive at least one of the segment block ($s_i$) and the segment block position information ($p_i$), and generate and output segment block space information ($space_i$) by calculating the space area of the segment block ($s_i$);

a space ratio characteristics detection unit configured to receive the overall handwritten signature block space information ($space_s$) and the segment block space information ($space_i$) from the overall handwritten signature block characteristics detection unit, and generate and output segment block space ratio information ($\Delta_i$) by calculating a ratio of the space area of the segment block against the overall handwritten signature block space; and a segment block characteristics information generation unit configured to generate, for each segment of the handwritten signature, the segment block characteristics information ($v_i$) including the segment block position information ($p_i$), the segment block space information ($space_{s_i}$), and the segment block space ratio information ($\Delta_i$), and generates and outputs the overall segment block characteristics information (V) on all segments of the entire handwritten signature.

5. The handwritten signature authentication system of claim 4, wherein the block is a polygon, wherein the segment block generation unit generates a polygon segment block surrounding a segment by passing through a top, a bottom, a leftmost, and a rightmost points of the segment.

6. The handwritten signature authentication system of claim 4, wherein the segment block generation unit further detects sub-segment blocks ($\acute{s}_{i.x}$) and vacancy blocks ($\tilde{s}_{i.y}$) that are generated by segments disjointed in each generated segment block, wherein the segment block position detection unit further detects and outputs sub-segment block position information ($\acute{p}_{i.x}$) for the sub-segment block ($\acute{s}_{i.x}$), and vacancy block position information ($\tilde{p}_{i.y}$) for a vacancy block ($\tilde{s}_{i.y}$), wherein the segment block space characteristics detection unit further generates and outputs sub-segment block space information ($space(\acute{s}_{i.x})$) and vacancy block space information ($space(\tilde{s}_{i.y}$) by calculating space areas of the sub-segment blocks ($\acute{s}_{i.x}$) and the vacancy blocks ($\tilde{s}_{i.y}$) respectively, wherein, in case that there exist a plurality of sub-segment blocks ($\acute{s}_{i.x}$) in a segment block ($s_i$), the space ratio characteristics detection unit outputs sub-segment block space ratio information ($\acute{\Delta}_{i.x}$) by calculating a ratio of the sub-segment block space ($space(\acute{s}_{i.x})$) against the segment block space ($space_{s_i}$) and outputs vacancy block space ratio information ($\tilde{\Delta}_{i.y}$) by calculating a ratio of the vacancy block space (space($\tilde{s}_{i.y}$) against the segment block space ($space_{s_i}$), wherein the segment block characteristics information generation unit generates and outputs the overall segment block characteristics information (V) further including: the sub-segment block position information ($\acute{p}_{i.x}$) for the sub-segment block ($\acute{s}_{i.x}$); the vacancy block position information ($\tilde{p}_{i.y}$) for the vacancy block ($\tilde{s}_{i.y}$); the sub-segment block space information (space($\acute{s}_{i.x}$)); the vacancy block space information (space($\tilde{s}_{i.y}$)); the sub-segment block space ratio information ($\acute{\Delta}_{i.x}$); and the vacancy block space ratio information ($\tilde{\Delta}_{i.y}$).

7. The handwritten signature authentication system of claim 3, wherein the overall handwritten signature block characteristics detection unit further generates and outputs the overall handwritten signature block space information ($space_s$) by calculating space area of the handwritten signature block (S), wherein the segment block correlation detection unit comprises:

an intersection space detection unit configured to detect any adjacent segment block ($s_i$) having a relation of inclusion or intersection with each segment block ($s_i$), and outputs, if any, intersection space information ($\delta_{ij}$) by calculating space area of inclusion or intersection;

an intersection space ratio detection unit configured to receive the overall handwritten signature block space information ($space_s$), the segment block space information ($space_i$), and the intersection space information ($\delta_{ij}$) as input, generate handwritten signature block intersection space ratio information ($r_{ij}$) by calculating a ratio of the intersection space ($\delta_{ij}$) against the overall handwritten signature block space $space_s$), generate segment block intersection space ratio information ($\pi'_{ij}$) by calculating a ratio of the intersection space ($\delta_{ij}$) against the segment block space ($space_i$), and generate adjacent segment block intersection space ratio information ($\pi''_{ij}$) by calculating a ratio of the intersection space ($\delta_{ij}$) against the adjacent segment block space ($space_{s_j}$);

a segment block inclusion relation detection unit configured to generate and output segment block inclusion relation information ($O_{ij}$) which shows whether an adjacent segment block ($s_i$) is included in or intersects with a segment block ($s_i$);

a segment positional relation detection unit configured to generate and output segment block positional relation information ($POS_{ij}$) representing relative position on all adjacent segment blocks ($s_j$) based on a segment block ($s_i$);

an edge positional relation detection unit configured to generate and output segment block edge positional relation information ($EDGE_{ij}$) representing relative edge position at which edge of a segment block ($s_i$) intersects with all adjacent segment blocks ($s_j$); and a correlation characteristics information generation unit configured to generate and output block correlation characteristics information (C) including the intersection space information ($\delta_{ij}$), the handwritten signature block intersection space ratio information ($r_{ij}$), the segment block intersection space ratio information ($\pi'_{ij}$), the adjacent segment block intersection space ratio information ($\pi''_{ij}$), the segment block inclusion relation information ($O_{ij}$), the segment block positional relation information ($POS_{ij}$), and the segment block edge positional relation information ($EDGE_{ij}$).

8. The handwritten signature authentication system of claim 3, wherein the time-division segment detection unit recognizes the segments sequentially divided by a time slice ($t_1$) from the touch data that is entered in real time.

9. The handwritten signature authentication system of claim 3, wherein the time-division segment detection unit counts input time of touch data when the touch data is entered, stores the entered touch data with timestamp information, and recognizes the segments divided by a time slice ($t_1$) based on handwritten signature elapsed time spent for signing the handwritten signature when the handwritten signature image is detected from the touch data.

10. A time-division segment block-based handwritten signature authentication method, comprising:

an enrollment process of storing handwritten signature input data including touch data entered from a handwritten signature input unit with timestamp information, recognizing segments divided by a time slice ($t_1$) from the handwritten signature input data and timestamp information, generating a handwritten signature image and segment images by identifying the handwritten signature, generating a handwritten signature block containing the handwritten signature image and segment blocks containing the segment images, collecting handwritten signature characteristics information ($\Sigma$) including handwritten signature block information, each segment block information, correlation information between the segment blocks, and correlation information between each segment block and the handwritten signature block, mapping the collected handwritten signature characteristics information to identification information of a signer, and enrolling the collected handwritten signature characteristics information in the enrollment unit; and a handwritten signature authentication process of collecting handwritten signature characteristics information ($\Sigma$) including correlation information between the segment blocks and correlation information between each segment block and the handwritten signature block from the touch data entered through the touch input unit of the handwritten signature input unit upon request for handwritten signature authentication, loading the enrolled handwritten signature characteristics information ($\Sigma'$) that corresponds with the identification information of the signer who requests handwritten signature authentication, and performing a segment-block-based handwritten signature authentication according to a match rate by comparing the enrolled handwritten signature characteristics information ($\Sigma'$) with the collected handwritten signature characteristics information ($\Sigma$).

11. The method of claim 10, wherein the enrollment process comprises:

an enrollment request monitoring operation that monitors whether handwritten signature enrollment is made;

a signer identification information acquisition operation that acquires the signer identification information to be enrolled upon request for handwritten signature enrollment;

a handwritten signature characteristics information acquisition operation that acquires the handwritten signature characteristics information ($\Sigma$) from touch data entered through the touch input unit regarding to the handwritten signature of the signer; and a handwritten signature enrollment operation that maps the handwritten signature characteristics information to the identification information of the signer and enrolls the handwritten signature characteristics information in the enrollment unit.

12. The method of claim 10, wherein the handwritten signature authentication process comprises:

a handwritten signature authentication request monitoring operation that monitors whether handwritten signature authentication is made;

a signer identification information acquisition operation that acquires the signer identification information upon request for handwritten signature authentication;

a handwritten signature characteristics information acquisition operation that acquires the handwritten signature characteristics information (Σ) from touch data entered from the touch input unit regarding to the handwritten signature of the signer;

an enrolled handwritten signature characteristics information loading operation that loads the pre-enrolled handwritten signature characteristics information (Σ') corresponding with the acquired signer identification information; and a handwritten signature authentication operation that performs handwritten signature authentication by comparing the acquired handwritten signature characteristics information (Σ) with the enrolled handwritten signature characteristics information (Σ') as loaded and outputs a result of the authentication.

13. The method of claim 12, wherein the handwritten signature characteristics information (Σ) acquisition operation comprises:

a handwritten signature tracking operation that begins tracking the handwritten signature from the touch data of the handwritten signature input data entered from the handwritten signature input unit;

a segment detection operation that counts time when the handwritten signature tracking begins, stores the handwritten signature input data with timestamp information, and recognizes and outputs segments divided by a time slice ($t_1$) from the handwritten signature input data and the timestamp information;

a segment count operation that counts a number of the segments detected by the segment detection unit;

a segment block characteristics detection operation that receives the segment image as input, creates each segment block ($s_i$) including the corresponding segment image, and generates and outputs each segment block characteristics information ($v_i$) on the created segment block ($s_i$);

an overall handwritten signature block characteristics detection operation that creates a handwritten signature block (S) including the acquired handwritten signature image, and generates and outputs overall handwritten signature block characteristics information (Q) on the handwritten signature block (S);

a segment block correlation detection operation that generates and outputs block correlation characteristics information (C) according to the correlations between the segment blocks and the correlations between the overall handwritten signature block and each segment block; and a handwritten signature block characteristics information generation operation that generates overall segment block characteristics information (V) including segment block characteristics information ($v_i$) on all segments, and generates and outputs handwritten signature characteristics information (Σ) including the overall handwritten signature block characteristics information (Q), the overall segment block characteristics information (V), and the block correlation characteristics information (C).

14. The method of claim 10, wherein the handwritten signature characteristics information (Σ) acquisition operation comprises:

a handwritten signature tracking operation that begins tracking the handwritten signature from the touch data of the handwritten signature input data entered from the handwritten signature input unit;

a segment detection operation that counts time when the handwritten signature tracking begins, stores the handwritten signature input data with timestamp information, and recognizes and outputs segments divided by a time slice ($t_1$) from the handwritten signature input data and the timestamp information;

a segment count operation that counts a number of the segments detected by the segment detection unit;

a segment block characteristics detection operation that receives the segment image as input, creates each segment block ($s_i$) including the corresponding segment image, and generates and outputs each segment block characteristics information ($v_i$) on the created segment block ($s_i$);

an overall handwritten signature block characteristics detection operation that creates a handwritten signature block (S) including the acquired handwritten signature image, and generates and outputs overall handwritten signature block characteristics information (Q) on the handwritten signature block (S);

a segment block correlation detection operation that generates and outputs block correlation characteristics information (C) according to the correlations between the segment blocks and the correlations between the overall handwritten signature block and each segment block; and a handwritten signature block characteristics information generation operation that generates overall segment block characteristics information (V) including segment block characteristics information ($v_i$) on all segments, and generates and outputs handwritten signature characteristics information (Σ) including the overall handwritten signature block characteristics information (Q), the overall segment block characteristics information (V), and the block correlation characteristics information (C).

15. The method of claim 14, wherein the overall handwritten signature block characteristics detection operation further generates and outputs overall handwritten signature block space information ($space_s$) by calculating space area of the handwritten signature block (S), wherein the segment block characteristics detection operation comprises:

a segment block generation operation that receives the segment images as input, and generates and outputs the segment block ($s_i$) including the corresponding segment image;

a segment block position detection operation that receives the segment block ($s_i$) as input, and detects and outputs segment block position information ($p_i$), which is position information on all edges of the segment block;

a segment block space characteristics detection operation that receives at least one of the segment block ($s_i$) and the segment block position information ($p_i$), and generates and outputs segment block space information ($space_{s_i}$) by calculating the space area of the segment block ($s_i$);

a space ratio characteristics detection operation that receives the segment block space information ($space_{s_i}$) and the overall handwritten signature block space information ($space_s$) detected from the overall handwritten signature block characteristics detection unit, and generates and outputs segment block space ratio information ($\Delta_i$) by calculating a ratio of the space area of the segment block ($space_{s_i}$) against the overall handwritten signature block space ($space_s$); and a segment block characteristics information generation operation that generates, for each segment of handwritten signature, segment block characteristics information ($v_i$) including the segment block position information ($p_i$), the segment block space information ($space_{s_i}$), and the segment block space ratio information ($\Delta_i$), and generates and outputs the overall segment block characteristics information (V) on all segments of the entire handwritten signature.

16. The method of claim 15, wherein the block is polygon, wherein the segment block generation unit generates a polygon segment block surrounding a segment by passing through a top, a bottom, a leftmost, and a rightmost points of the segment in the segment block generation operation.

17. The method of claim 15, wherein the segment block generation operation comprises:

a segment block detection operation that receives the segment images as input, and generates and outputs the segment block ($s_i$) including the corresponding segment image;

a sub-segment block detection operation that detects sub-segment blocks ($\acute{s}_{i.x}$) with respect to sub-segments generated by disjointed segments in each generated segment block; and a vacancy block detection operation that detects vacancy blocks ($\tilde{s}_{i.y}$) which are vacancy space generated by the sub-segment blocks in each generated segment block, wherein the segment block position detection operation comprises:

a segment block position information generation operation that receives the segment blocks ($s_i$), and detects and outputs segment block position information ($p_i$) which is information on all edges of each segment block;

a sub-segment block position information generation operation that detects and outputs sub-segment block position ($\acute{p}_{i.x}$) for each sub-segment block ($\acute{s}_{i.x}$); and a vacancy block position information generation operation that detects and outputs vacancy block position information ($\tilde{p}_{i.y}$) for each vacancy block ($\tilde{s}_{i.y}$), wherein the segment block space characteristics information detection operation comprises:

a segment block space characteristics generation operation that receives at least one of the segment block ($s_i$) and the segment block position information ($p_i$), and generates and outputs segment block space information ($space_{s_i}$) by calculating the space area of each segment block ($s_i$);

a sub-segment block space characteristics information generation operation that generates and outputs sub-segment block space information ($space(\acute{s}_{i.x})$) by calculating the space area of the sub-segment block ($\acute{s}_{i.y}$); and a vacancy block space characteristics information generation operation that generates and outputs vacancy block space information ($space(\tilde{s}_{i.y})$) by calculating the space area of the vacancy blocks ($\tilde{s}_{i.y}$), wherein the space ratio characteristics detection operation comprises:

a space ratio characteristics information generation operation that receives the overall handwritten signature block space information ($space_s$) and the segment block space information ($space_{s_i}$) from the overall handwritten signature block characteristics detection operation, and generates and outputs segment block space ratio information ($\Delta_i$) by calculating a ratio of the segment block space ($space_{s_i}$) against the overall handwritten signature block space ($space_s$);

a sub-segment space ratio characteristics information generation operation that, in case that there exist a plurality of sub-segment blocks ($\acute{s}_{i.x}$) in a segment block ($s_i$), generates and outputs sub-segment block space ratio information ($\acute{\Delta}_{i.x}$) by calculating a ratio of the sub-segment block space ($space(\acute{s}_{i.x})$) against the segment block space ($space_{s_i}$); and a vacancy block space ratio characteristics information generation operation that, in case that there exist a plurality of sub-segment blocks ($\acute{s}_{i.x}$) in a segment block ($s_i$), generates and outputs vacancy block space ratio information ($\tilde{\Delta}_{i.y}$) by calculating a ratio of the vacancy block space ($space(\tilde{s}_{i.y})$) against the segment block space ($space_{s_i}$), wherein the segment block characteristics information generation operation generates and outputs the overall segment block characteristics information (V) further including: the sub-segment block position information ($\acute{p}_{i.x}$) for the sub-segment block ($\acute{s}_{i.x}$); the vacancy block position information ($\acute{p}_{i.y}$) for the vacancy block ($\tilde{s}_{i.y}$); the sub-segment block space information ($space(\acute{s}_{i.x})$); the vacancy block space information ($space(\tilde{s}_{i.y})$); the sub-segment block space ratio information ($\acute{\Delta}_{i.x}$); and the vacancy block space ratio information ($\tilde{\Delta}_{i.y}$).

18. The method of claim 14, wherein the overall handwritten signature block characteristics detection operation further generates and outputs the overall handwritten signature block space information ($space_s$) by calculating space area of the handwritten signature block (S), wherein the segment block correlation detection operation comprises:

an intersection space detection operation that detects any adjacent segment block ($s_j$) having a relation of inclusion or intersection with each segment block ($s_i$), and outputs, if any, intersection space information ($\delta_{ij}$) by calculating space area of inclusion or intersection;

an intersection space ratio detection operation that receives the overall handwritten signature block space information ($space_s$), the segment block space information ($space_{s_i}$), and the intersection space information ($\delta_{ij}$) as input, generates handwritten signature block intersection space ratio information ($r_{ij}$) by calculating a ratio of the intersection space ($\delta_{ij}$) against the overall handwritten signature block space ($space_s$), generates segment block intersection space ratio information ($\pi'_{ij}$) by calculating a ratio of the intersection space ($\delta_{ij}$) against the segment block space ($space_{s_i}$), and generates adjacent segment block intersection space ratio information ($\pi''_{ij}$) by calculating a ratio of the intersection space ($\delta_{ij}$) against the adjacent segment block space ($space_{s_i}$);

a segment block inclusion relation detection operation that generates and outputs segment block inclusion relation information ($O_{ij}$) which shows whether an adjacent segment block ($s_i$) is included in or intersects with a segment block ($s_i$);

a segment positional relation detection operation that generates and outputs segment block positional relation information ($POS_{ij}$) representing relative position on all adjacent segment blocks ($s_j$) based on a segment block ($s_i$);

an edge positional relation detection operation that generates and outputs segment block edge positional relation information ($EDGE_{ij}$) representing relative edge position at which edge of a segment block ($s_i$) intersects with all adjacent segment block ($s_i$); and a correlation characteristics information generation operation that generates and outputs block correlation characteristics information (C) including the intersection space information ($\delta_{ij}$), the handwritten signature block intersection space ratio information ($r_{ij}$), the segment block intersection space ratio information ($\pi'_{ij}$), the adjacent segment block intersection space ratio information ($\pi''_{ij}$), the segment block inclusion relation information ($O_{ij}$), the segment block positional relation information ($POS_{ij}$), and the segment block edge positional relation information ($EDGE_{ij}$).

* * * * *